(12) United States Patent
Kim et al.

(10) Patent No.: US 9,696,542 B2
(45) Date of Patent: Jul. 4, 2017

(54) INPUT DEVICE DISPOSED IN HANDLE AND VEHICLE INCLUDING THE SAME

(71) Applicant: LG Electronics Inc., Seoul (KR)

(72) Inventors: Hyongguk Kim, Seoul (KR); Youngchan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/483,630

(22) Filed: Sep. 11, 2014

(65) Prior Publication Data

US 2015/0145790 A1    May 28, 2015

(30) Foreign Application Priority Data

Nov. 22, 2013  (KR) .......................... 10-2013-0143156

(51) Int. Cl.
    *G02B 27/01*    (2006.01)
    *B60K 35/00*    (2006.01)
    *B60K 37/06*    (2006.01)

(52) U.S. Cl.
    CPC ............. *G02B 27/01* (2013.01); *B60K 35/00* (2013.01); *B60K 37/06* (2013.01); *B60K 2350/1036* (2013.01); *B60K 2350/2004* (2013.01); *B60K 2350/928* (2013.01); *G02B 2027/014* (2013.01); *G02B 2027/0187* (2013.01)

(58) Field of Classification Search
    None
    See application file for complete search history.

(56) References Cited

U.S. PATENT DOCUMENTS

| 2002/0085043 A1* | 7/2002 | Ribak | B60K 35/00 715/810 |
| 2006/0227066 A1 | 10/2006 | Hu et al. | |
| 2006/0262103 A1* | 11/2006 | Hu | G06F 3/023 345/173 |
| 2008/0059024 A1* | 3/2008 | Hara | B60R 16/0231 701/36 |
| 2010/0238129 A1* | 9/2010 | Nakanishi | G06F 3/016 345/173 |

(Continued)

FOREIGN PATENT DOCUMENTS

| CN | 102951101 | 3/2013 |
| CN | 103144586 | 6/2013 |

(Continued)

OTHER PUBLICATIONS

Extended European Search Report issued in European Application No. 14193630.2 on Jul. 3, 2015, 6 pages.

(Continued)

*Primary Examiner* — Nalini Mummalaneni
*Assistant Examiner* — Christopher Kohlman
(74) *Attorney, Agent, or Firm* — Fish & Richardson P.C.

(57) ABSTRACT

An input device including: an input unit having a plurality of buttons disposed in a handle of a vehicle; an interface unit configured to receive data concerning the vehicle or to transmit an input signal received via the input unit to an external device; a processor configured to change a function of at least one of the plurality of buttons to a set function based on a manipulation signal from the input unit; and a display configured to display an image corresponding to the set function of the at least one of the plurality of buttons.

20 Claims, 37 Drawing Sheets

(56) References Cited

U.S. PATENT DOCUMENTS

| | | | |
|---|---|---|---|
| 2010/0268426 A1 | 10/2010 | Pathak et al. | |
| 2012/0272193 A1* | 10/2012 | Michaelis | B60K 37/06 715/863 |
| 2012/0283894 A1* | 11/2012 | Naboulsi | A61B 5/18 701/1 |
| 2012/0315960 A1* | 12/2012 | Kim | H04W 52/0254 455/574 |
| 2013/0050114 A1* | 2/2013 | Backman | B60K 37/06 345/173 |
| 2013/0151072 A1* | 6/2013 | Jeong | B62D 1/046 701/36 |
| 2014/0163774 A1* | 6/2014 | Demeniuk | G08C 17/02 701/2 |
| 2015/0143941 A1* | 5/2015 | Oeltjebruns | B60Q 1/0082 74/484 R |

FOREIGN PATENT DOCUMENTS

| | | |
|---|---|---|
| EP | 1344706 | 9/2003 |
| KR | 1999039061 | 6/1999 |
| KR | 457141 B1 | 11/2004 |
| KR | 2012137905 A | 12/2012 |

OTHER PUBLICATIONS

Office Action issued in Chinese Application No. 201410681894.5 on Jul. 21, 2016, 17 pages (with English translation).

* cited by examiner

INPUT DEVICE DISPOSED IN HANDLE AND VEHICLE INCLUDING THE SAME

CROSS-REFERENCE TO RELATED APPLICATION

This application claims the priority benefit of Korean Patent Application No. 10-2013-0143156, filed on Nov. 22, 2013 in the Korean Intellectual Property Office, the disclosure of which is incorporated herein by reference in its entirety.

BACKGROUND OF THE INVENTION

Field of the Invention

Embodiments of the invention relate to an input device disposed in a handle and a vehicle including the same and, more particularly, to an input device disposed in a handle, which is capable of improving user convenience and driving stability, and a vehicle including the same.

Description of the Related Art

In general, a vehicle is directed by a driver to a desired direction. A representative example of a vehicle includes a car. A driver can steer while holding a handle and moving the handle in a circular manner to steer the vehicle.

Buttons for enabling functions can be disposed in the handle of the vehicle. In this case, the function of each button is fixed in that the every button only has one function. Such button specific operation for functions results in buttons frequently used and buttons infrequently used, which is not efficient. Further, many buttons make the driver search for the right button and thus take the driver's attention away from a focus on driving.

SUMMARY OF THE INVENTION

Embodiments of the invention is directed to an input device disposed in a handle and a vehicle including the same that substantially obviates one or more of the problems due to limitations and disadvantages of the related art.

An object of embodiments of the invention is to provide an input device disposed in a handle, which is capable of improving user convenience and driving stability, and a vehicle including the same.

Additional features and advantages of embodiments of the invention will be set forth in the description which follows, and in part will be apparent from the description, or can be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, An input device including: an input unit having a plurality of buttons disposed in a handle of a vehicle; an interface unit configured to receive data concerning the vehicle or to transmit an input signal received via the input unit to an external device; a processor configured to change a function of at least one of the plurality of buttons to a set function based on a manipulation signal from the input unit; and a display configured to display an image corresponding to the set function of the at least one of the plurality of buttons.

In accordance with another aspect of embodiments of the invention, there is provided a vehicle including: wheels that can be rotated by a power source; a handle configured to steer; a plurality of buttons disposed in the handle of the vehicle; a processor connected to the plurality of buttons and configured to change a function of at least one of the plurality of buttons to a set function based on a manipulation signal; an interface unit configured to receive data concerning the vehicle and to transmit an input signal received to an external device; and a display configured to display an image corresponding to the set function of the at least one of the plurality of buttons.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

DETAILED DESCRIPTION OF THE PREFERRED EMBODIMENTS

Figure 1:
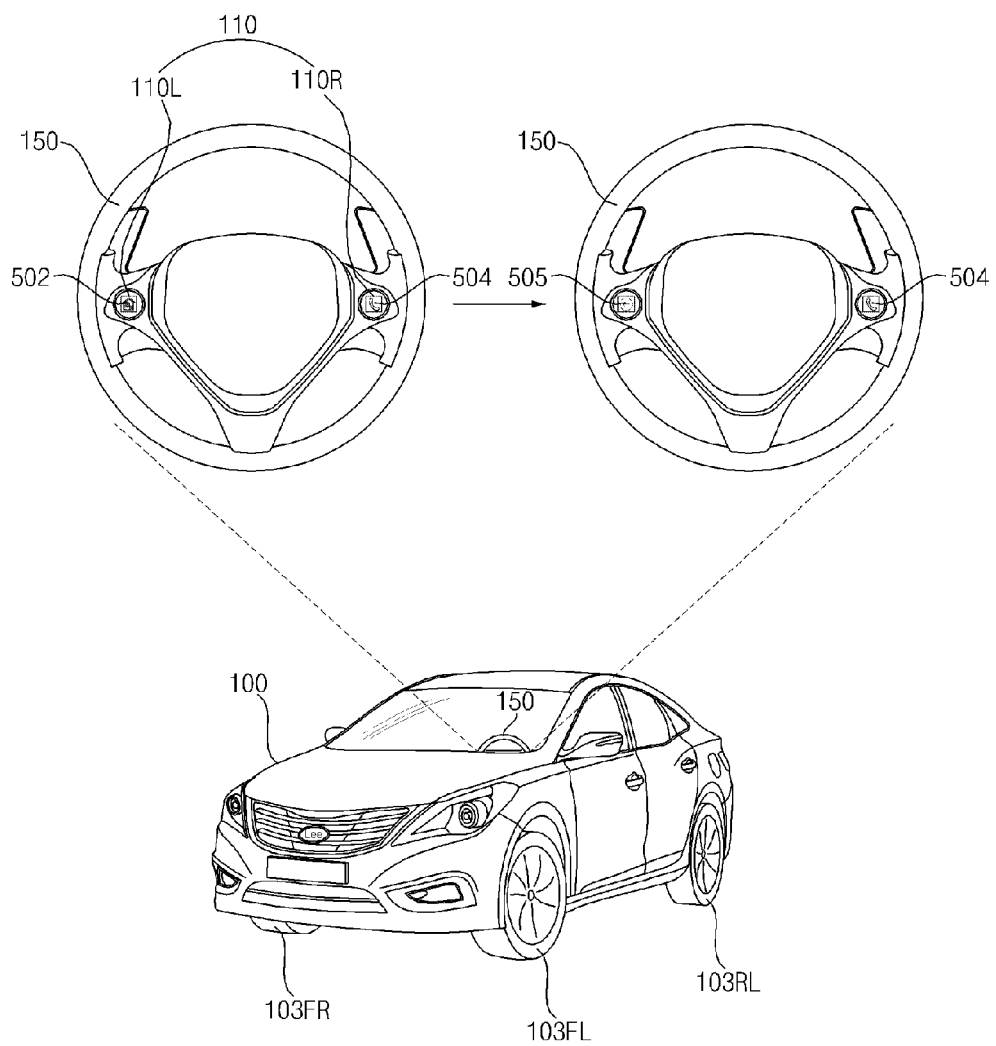
FIG. 1 is a diagram showing a vehicle and a handle disposed in the vehicle according to an embodiment of the invention.

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

The terms "module" and "unit" are only used to describe components as an aid in understanding the components. Thus, the terms "module" and "unit" should not be considered as having specific meanings or roles. Accordingly, the terms "module" and "unit" may be used interchangeably.

A vehicle described in the present invention may include a car, a truck, a bus, a motorcycle and a bicycle. Hereinafter, a car will be the example of a vehicle. An input device disposed in a handle of a vehicle described in the present invention can be referred to as a dynamic human machine interface (HMI), the function of which can be changed according to one of a user manipulation and a vehicle driving state. Hereinafter, the input device disposed in the handle of the vehicle according to embodiments of the invention will be described.

FIG. 1 is a diagram showing a vehicle and a handle disposed in the vehicle according to an embodiment of the invention. Referring to FIG. 1, the vehicle 100 includes wheels 103FR, 103FL, 103RL, which rotate by a power source (not shown), a handle 150 for steering the vehicle 100 and an input device 110 disposed in the handle 150. The input device 110 is a plurality of buttons 110L and 110R disposed in the handle 150, the function of at least one of the plurality of buttons is changeable. The vehicle 100 may include one of a combustion engine for supplying power using fossil fuels and an electric motor for supplying power using a DC power source, such as a solar cell or a battery. In addition, the vehicle 100 may include a transmission (not shown) for converting power from the motor into rotation force to the wheels 103FR, 103FL, 103RL, and a brake (not shown) for stopping the vehicle. The vehicle 100 described in the present specification may include a vehicle having a combustion motor, a hybrid vehicle having both a combustion motor and an electric motor, and an electric vehicle with just an electric motor.

As shown in FIG. 1, a first button 110L and a second button 110R are disposed at the left and right sides of the handle 150. The first button 110L and the second button 110R can display first and second images 502 and 504 indicating their functions, respectively. At least one of the first button 110L and the second button 110R may be manipulated by a user such that functions and displayed images change.

A button of the input unit 110 can perform an input function and an output function so as to be referred to as an input/output unit since an input on one button can output a change of the images as well as a function of the button. For example, if a user presses the first button 110L of the input unit 110 with a first function (a home button function) while driving the vehicle 100, as shown in FIG. 1, the function of the first button 110L can be changed from a first function (a home button function) to a second function (a menu button function). A third image 505 corresponding to the second function (a menu button function) can be displayed on the first button 110L. Accordingly, the user can change the function of at least one of the first button 110L and the second button 110R to a desired function so as to find and perform a desired function while driving the vehicle and gripping the handle of the vehicle.

Unlike a fixed button disposed in the handle of the vehicle, user convenience is increased since the function of a button can be dynamically changed. For example, the user can access and perform various functions with slight hand movements, more particularly, thumbs of a user's hands, which are on the handle 150 of the vehicle, while the user is looking at the road during driving. Thus, driving stability is improved as compared to various conventional fixed button methods of finding numerous buttons on and off the steering handle of the vehicle.

The function of the buttons in embodiments of the invention can be changed based on a manipulation signal input onto another button by the user while driving the vehicle. Alternatively, the function of the button in embodiments of the invention can be changed according to a vehicle driving environment, for example, road conditions, weather condition or vehicle interior status. The function of a button in embodiments of the invention can be set on a per user basis. Accordingly, a multi-user friendly dynamic button input system is provided in embodiments of the invention.

Figure 2:
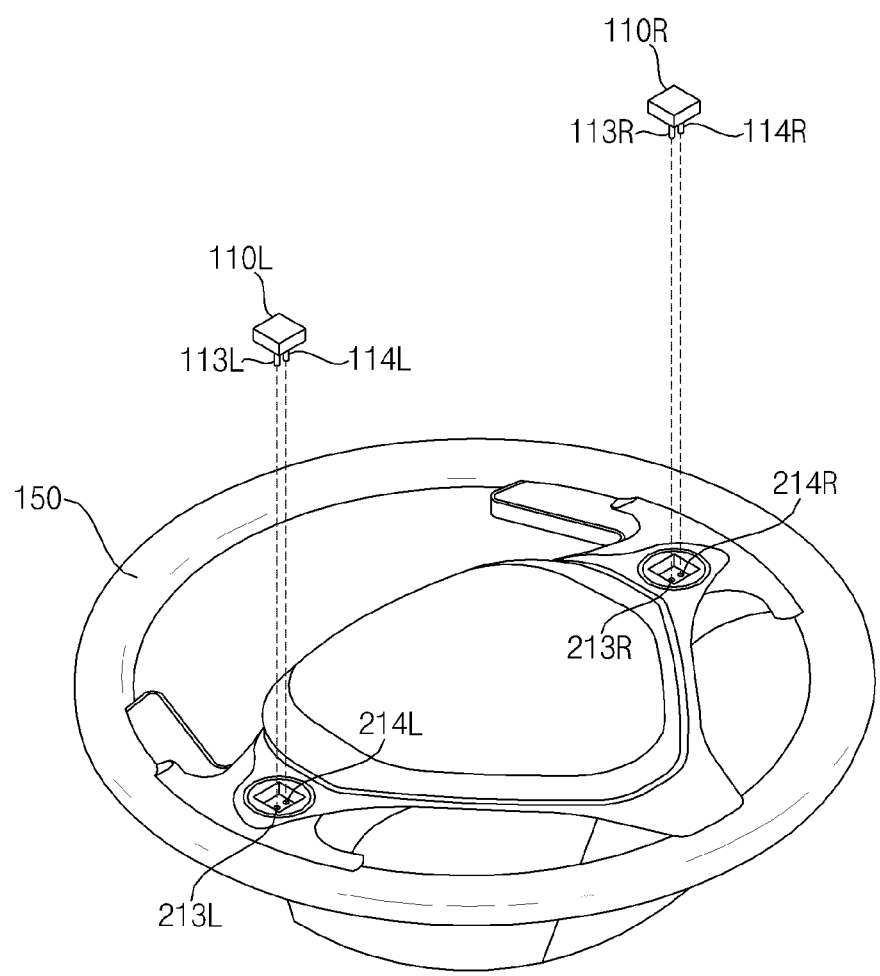
FIG. 2 is a diagram showing coupling between a handle and an input unit of FIG. 1.

FIG. 2 is a diagram showing coupling between the handle and an input unit of FIG. 1. As shown in FIG. 2, the first button 110L and the second button 110R included in the input unit 110 can be disposed in the central portion of the handle 150. Although the first button 110L and the second button 110R have a cuboid shape with a rectangular appearance in a plan view, the first button 110L and the second button 110R can have a cylindrical shape with circular appearance in a plan view.

Referring to FIG. 2, the first button 110L may include connection terminals 113L and 114L and the second button 110R may include connection terminals 113R and 114R for interconnecting the respective buttons into the handle 150. The handle 150 may include coupling receivers 213L and 214L for the connection terminals 113L and 114L corresponding to the first button 110L and the coupling receivers 213R and 214R for the connection terminals 113R and 114R corresponding to the second button 110R. The connection terminals 113L and 114L corresponding to the first button 110L can correspond to a power supply terminal for receiving power from a battery (not shown) mounted in the vehicle and a terminal for data exchange with an electronic device mounted in the vehicle, such as, an audio video navigation (AVN) device. The connection terminals 113R and 114R corresponding to the second button 110R can correspond to a power supply terminal for receiving power from a battery (not shown) mounted in the vehicle and a terminal for data exchange with an electronic device mounted in the vehicle, such as, an audio video navigation (AVN) device, respectively.

Figure 3:
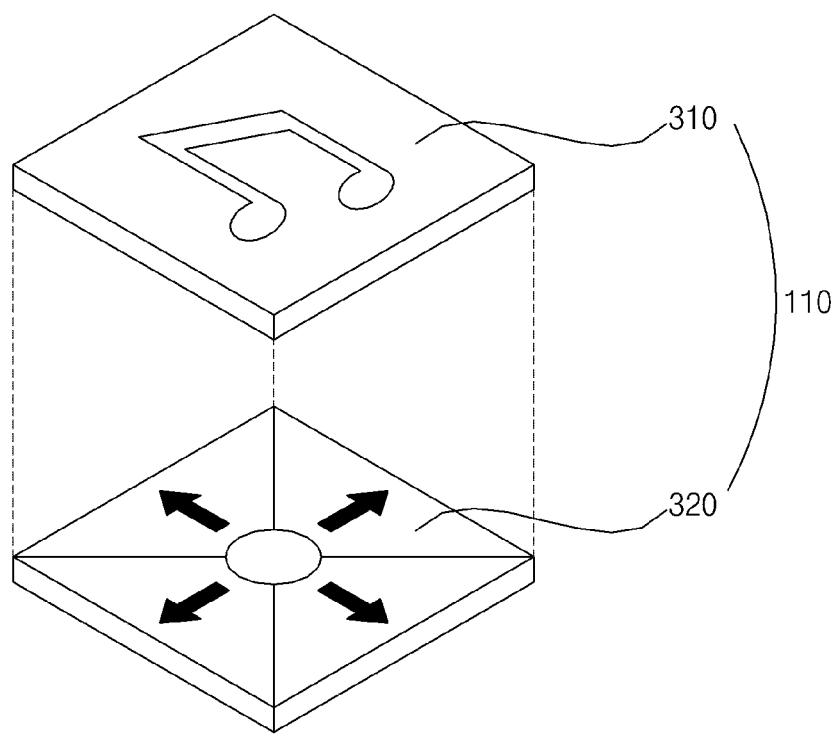
FIG. 3 is a diagram showing an example of the structure of one of the buttons in the input unit of FIG. 1.

FIG. 3 is a diagram showing an example of the structure of one of the buttons in the input unit of FIG. 1. As shown in FIG. 3, the input unit 110, that is, the button, may include a touchscreen 310 and a four-direction key 320 located below the touchsceeen 310. The touchscreen 310 can sense touch of a user's finger using various methods, such as a capacitive method or a resistive method, and display an image corresponding to a touch operation or a predetermined function. Tap input, drag input, flick (swipe) input may also be performed via the touchscreen 310. A tap input can be used for selection of a predetermined item/function or for conversion into a low-level item/function. A flicking (swiping) input can be used for conversion into an item or function of the same level. The four-direction key 320 may include up, down, left and right direction keys. Any one of the up, down, left and right direction keys can be selected according to the location of the user's finger.

The input unit 110 may alternatively further include a vibration unit (not shown) that vibrates in correspondence with touch input of the user, for example, tap input, drag input or flicking input. In another alternative, unlike in FIG. 3, the input unit 110 may include only the touchscreen 310 without the four-direction key 320. In yet another alternative, unlike FIG. 3, the input unit 110 may include only the four-direction key 320 without the touchscreen 310.

Figure 4:
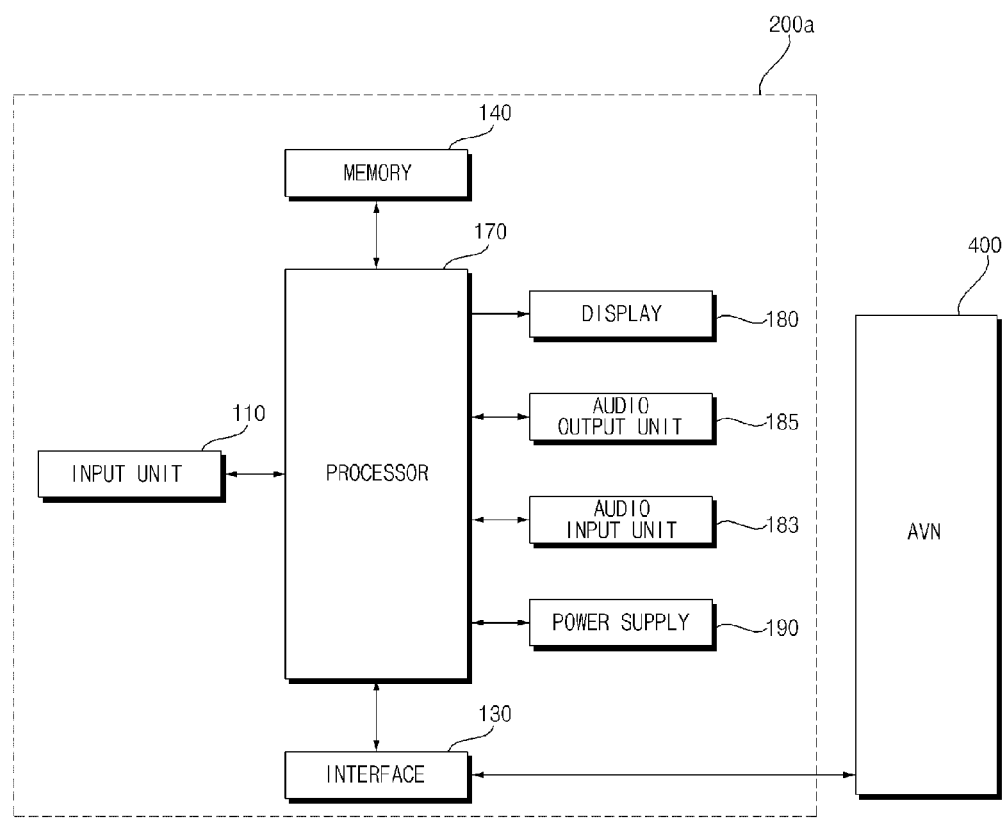
FIG. 4 is a block diagram of an input device disposed in a handle according to a first embodiment of the invention.

FIG. 4 is a block diagram of an input device disposed in a handle according to a first embodiment of the invention. Referring to FIG. 4, the input device 200a disposed in the handle 150 according to the first embodiment of the invention may include an input unit 110, an interface 130, a memory 140, a processor 170, a display 180, an audio input unit 183, an audio output unit 185 and a power supply 190. The input unit 110 includes a plurality of buttons disposed in the handle of the vehicle. As described with reference to FIGS. 1 to 3, the input unit 110 may include the first button 110L and the second button 110R. Each of the first button 110L and the second button 110R may include a touchscreen 310, as shown in FIG. 3. The function of each of the first button 110L and the second button 110R can be changed based on at least one of tap input, drag input and flick (swipe) input on a touch screen 310. Alternatively, the function of each of the first button 112L and the second button 110R can be changed according to a vehicle driving environment, such as road conditions, weather or vehicle interior status.

The interface 130 of FIG. 4 can receive vehicle-related data or transmit an input signal received via the input unit 110 to an external device. The interface 130 can perform data communication with an electronic control unit (ECU) or AVN 400 mounted in the vehicle using a wired communication method. For example, the interface 130 can use the connection terminal 114L of the first button 110L and the connection terminal 114R of the second button 110R, as shown in FIG. 2, for data exchange in a wired connection method. In another example, the interface 130 can receive global positioning system (GPS) information via data communication with the AVN and receive vehicle state information via data communication with the ECU. Such vehicle state information may include at least one or more of battery information, fuel information, vehicle speed information, tire information, steering information due to handle rotation, vehicle lamp information, vehicle interior temperature information, vehicle exterior temperature information, and vehicle interior humidity information.

The memory 140 of FIG. 4 can store a variety of data for operation of the input device 200a, such as a program for processing in or control of the processor 170. For example, the memory 140 can store functions implemented via the input unit 110 as well as the images displayed thereon. In addition, the memory 140 can store the function scheme of the input unit 110, which is a changeable on a user basis.

The audio output unit 185 of FIG. 4 converts an electrical signal from the processor 170 into an audio signal and outputs the audio signal. The audio output unit 185 may include a speaker, etc. The audio output unit 185 can output sound corresponding to the operation of the input unit 110, such as a button. The audio input unit 183 of FIG. 4 can receive a user's voice. The audio input unit 183 may include a microphone. The audio input unit can convert the received voice into an electrical signal and send the electrical signal to the processor 170.

The processor 170 can control overall operation of each unit of the input device 200a, as shown in FIG. 4. For example, the processor 170 can change the function of at least one of the plurality of buttons based on a manipulation signal input to the input unit by the user. More specifically, if the button includes the touchscreen 310, the processor 170 can change the function of at least one of the plurality of buttons based on at least one of tap input, dragging input or flicking input to a touchscreen. Further, the processor 170 can control the display of the image corresponding to a set function on the touchscreen for a button. If the button includes the four-direction key 320 without the touchscreen, the processor 170 can change the function of the button based on at least one of press input strength, a quick successive number of presses and duration of a press on the four-direction key 320. If any one of the plurality of buttons is manipulated when the vehicle handle is rotated by a predetermined angle or more, the processor 170 will not respond to a manipulation signal from the button. That is, the function of a button will not be changed or activated until the vehicle handle is rotated to less than a predetermined angle.

The processor 170 can set at least one of a home function, a menu function or a vehicle inner setting function on the first button based on a manipulation signal for the first button among the plurality of buttons. The processor 170 can generate a vehicle inner setting signal if a user manipulation input for the second button among the plurality of buttons is received when the first button among the plurality of buttons is set as the vehicle inner setting function. At this time, the interface 130 can output the vehicle inner setting signal to the ECU (not shown) mounted in the vehicle. The vehicle inner setting function may include at least one of vehicle interior window control, vehicle interior audio output control, vehicle interior air-conditioning control, vehicle interior lamp control, vehicle exterior lamp control or sunroof control. Further, the processor 170 can control setting of any one of the plurality of buttons to at least one of a telephone function, a messenger function, a memo function, a schedule function, a social networking service (SNS) function, a web access function or a content playback function performed via a mobile terminal The processor 170 can change the function of at least one of the plurality of buttons based on external environment information. Such external environment information may include at least one of call reception information, GPS information, weather information, time information or location information. For example, the processor 170 can change the function of at least one of the plurality of buttons based on GPS information from the AVN (not shown).

In another example, the processor 170 can set the function of at least one of the plurality of buttons on a per user basis. In yet another example, the processor 170 can change the function of at least one of the plurality of buttons based on vehicle state information. Examples of vehicle state information include battery information, fuel information, vehicle speed information, tire information, steering information, vehicle lamp information, vehicle interior temperature information, vehicle exterior temperature information and vehicle interior humidity information.

The display 180 can separately display an image corresponding to the function of the button. To display the image, the display 180 may include a cluster or a head-up display (HUD) on the internal front surface of the vehicle. If the display 180 is a HUD, a projection module for projecting an image onto the windshield is positioned in the vehicle.

The power supply 190 can supply power necessary for operation of each component under control of the processor 170. Such a power supply 190 may include the connection terminal 113L of the first button 110L and the connection terminal 113R of the second button 110R to receive power from the battery mounted in the vehicle, as previously described with reference to FIG. 2.

Figure 5A:
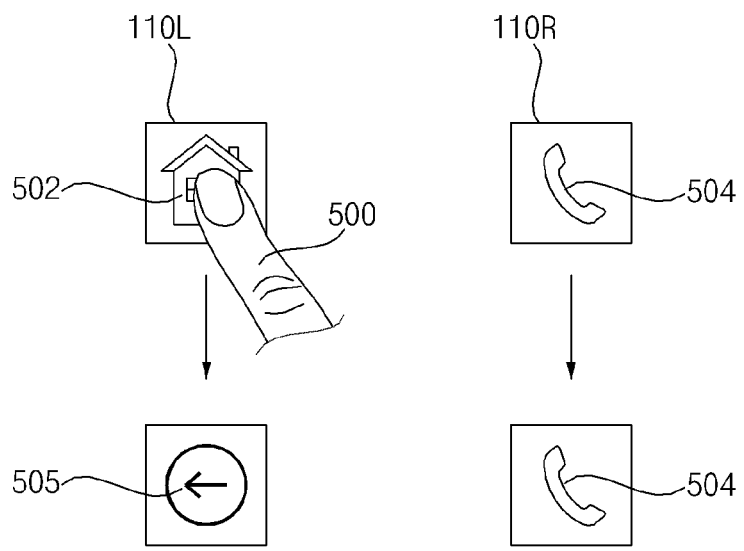
FIGS. 5a and 5b show accessing a vehicle interior function through the input device according to a first embodiment of the invention.
Figure 5B:
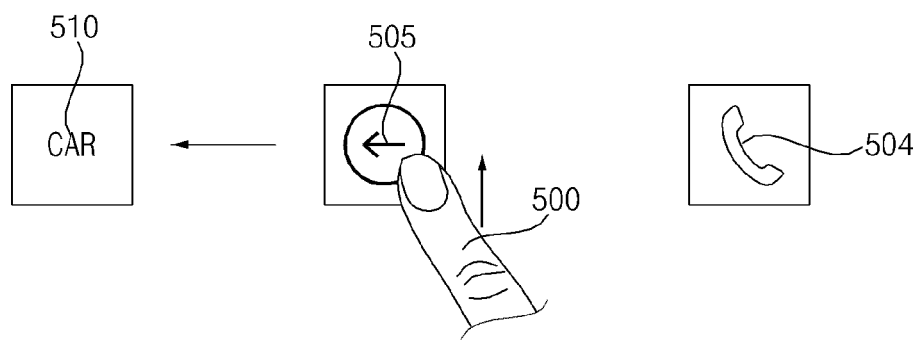
Figure 6:
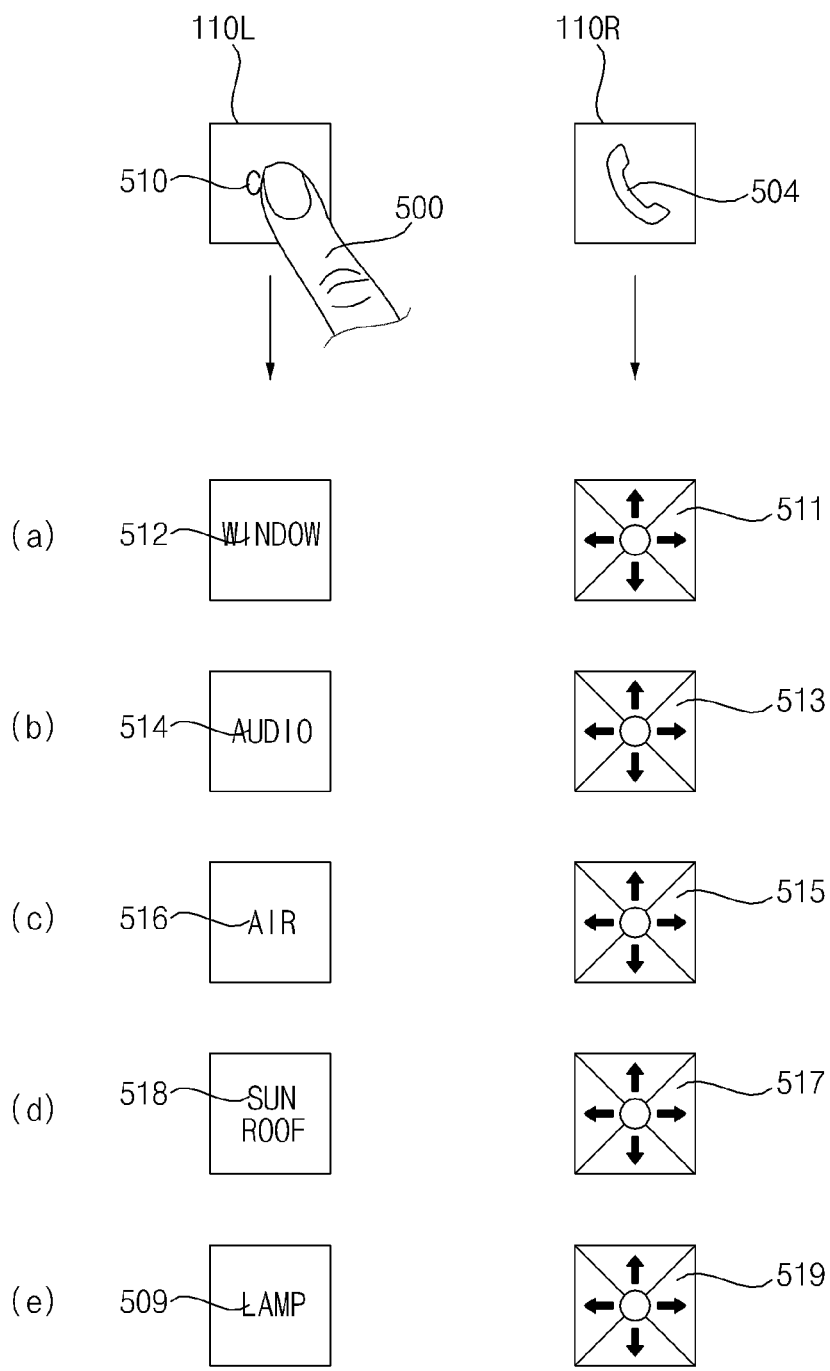
FIGS. 6a-6e show accessing sub items controlled with directional arrows through the input device according to a first embodiment of the invention.

FIGS. 5a and 5b show accessing a vehicle interior function through the input device according to a first embodiment of the invention. Referring to FIG. 5a, if a user enters a vehicle and starts the vehicle, a home function can be set and an image 502 indicating the home function can be displayed on the first button 110L. A telephone function can be set and an image 504 indicating the telephone function can be displayed on the second button 110R. Each of the first button 110L and the second button 110R can perform touch input and include a touchscreen for displaying a predetermined image. If the user performs a tap input to the first button 110L using a user's finger 500, as shown in FIG. 5a, a menu function can be set and an image 505 indicating the menu function can be displayed.

The function of the first button 110L can be changed by a tap input and the image corresponding to the changed function can be displayed, thereby increasing user convenience. The home function set on the first button 110L of FIG. 5a can be activated only for a predetermined time period after starting the vehicle and then can be deactivated, that is, can enter a sleep mode, if user touch input is not received for a predetermined time period. Thus, the first button 110L and the second button 110R can enter a standby mode without displaying a predetermined image. Thereafter, when the user touches any one of the first button 110L and the second button 110R, the sleep mode can be released and the function of any one of the first button 110L and the second button 110R and the image corresponding thereto can be displayed. The sleep mode can be set or released under control of the processor 170.

Referring to FIG. 5b, if the user performs flicking input to the first button 110L using the user's finger 500 when the menu function and the image 505 corresponding thereto are displayed on the first button 110L and the telephone function and the image 504 corresponding thereto are displayed on the second button 110R, and, more particularly, if upward flicking input is performed, as shown in FIG. 5b, a vehicle inner setting function can be set and the image 510 indicating the vehicle inner setting function can be displayed.

In FIGS. 5a and 5b, a menu function item and a vehicle interior function item are located under a home function item. At this time, although the menu function item and the vehicle interior function item can be set at the same level as shown in FIGS. 5a and 5b, various modifications to levels, such as level change or item deletion from a level are possible.

FIGS. 6a-6e show accessing sub items controlled with directional arrows through the input device according to a first embodiment of the invention. As shown in FIGS. 6a-6e, if user's finger 500 performs a tap input to the first button 110L when the vehicle inner setting function and the image 510 corresponding thereto are displayed on the first button 110L while the telephone function and the image 504 corresponding thereto are displayed on the second button 110R, any one of sub items of the various vehicle function items can be set and the image corresponding to the function thereof can be displayed. As shown in FIGS. 6a-6e, sub items of the vehicle function item are a vehicle window function item, a vehicle audio function item, a vehicle air-conditioning function item, a vehicle sunroof function item and a vehicle lamp function items are shown.

If an initial tap input to the first button 110L is performed when the vehicle interior function item is set on the first button 110L, a vehicle window function item and an image 512 corresponding thereto are displayed, as shown in FIG. 6a. Upon a next tap, a vehicle audio function item and an image 514 corresponding thereto are displayed, as shown in FIG. 6b. Subsequent taps further cause a vehicle air-conditioning function item and an image 516 corresponding thereto to displayed, as shown in FIG. 6c, a vehicle sunroof function item and an image 518 corresponding thereto to be displayed, as shown in FIG. 6d, and a vehicle lamp function and an image 509 corresponding thereto are displayed as shown in FIG. 6e.

On the second button 110R, in correspondence with the respective functions, up, down, left and right direction function items are displayed for one or more vehicle functions. As shown in FIG. 6a, up, down, left and right direction function items are displayed as image 511 for both up/down adjustment of a vehicle window and vehicle window selection. As shown in FIG. 6b, up, down, left and right direction function items are displayed as image 513 for both vehicle audio volume control and vehicle audio source change. As shown in FIG. 6c, up, down, left and right direction function items are displayed as image 515 for both vehicle interior temperature settings and fan control. As shown in FIG. 6d, up, down, left and right direction function items are displayed as image 517 for open/close control of a vehicle sunroof. As shown in FIG. 6e, up, down, left and right direction function items are displayed as image 519 for vehicle exterior lamp selection. Accordingly, a driver can perform various vehicle interior settings while driving the vehicle in a state in which the driver's hands are on the steering handle.

Figure 7A:
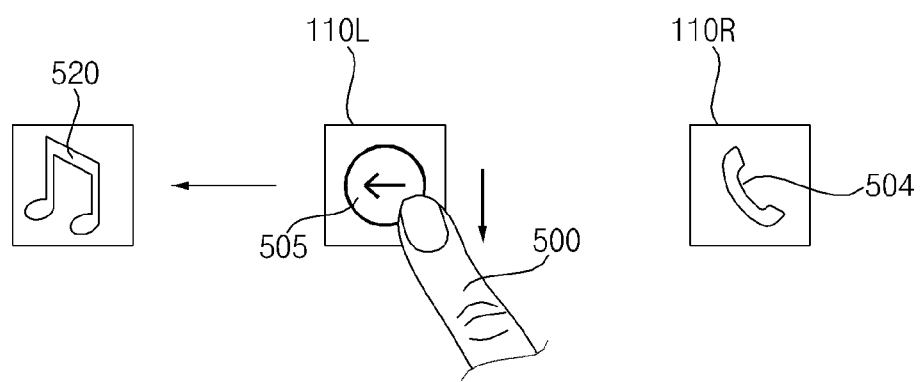
FIGS. 7a-7g show accessing function items with flicking through the input device according to a first embodiment of the invention.

FIGS. 7a-7g show accessing function items with flicking through the input device according to a first embodiment of the invention. As shown in FIG. 7a, if a user's finger 500 performs a downward flicking input to the first button 110L when a menu function and an image 505 corresponding thereto are displayed on the first button 110L, and while a telephone function and an image 504 corresponding thereto are displayed on the second button 110R, an image 520 indicating a music output function can be displayed showing a music output function is set.

Figure 7B:
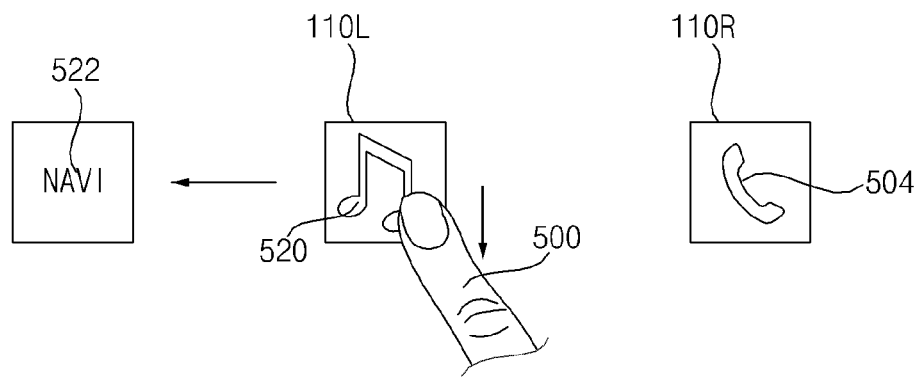

Next, referring to FIG. 7b, if a user's finger 500 performs another downward flicking input to the first button 110L when a music output function and an image 520 corresponding thereto are displayed on the first button 110L, and while a telephone function and an image 504 corresponding thereto are displayed on the second button 110R, an image 522 indicating a navigation execution function can be displayed showing a navigation execution function is set.

Figure 7C:
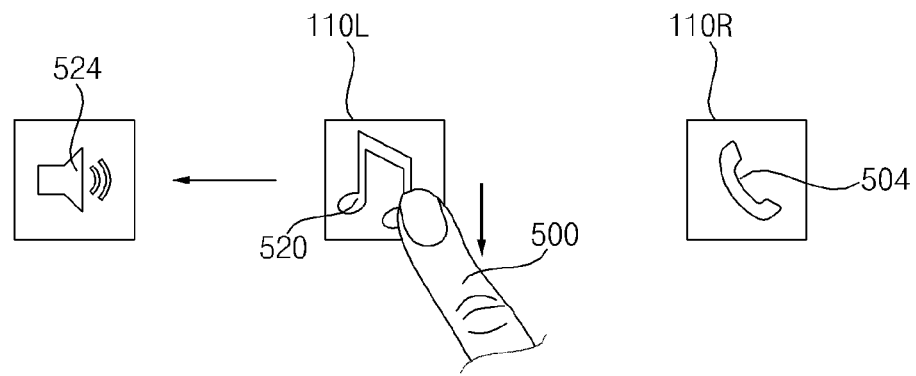
Figure 7D:
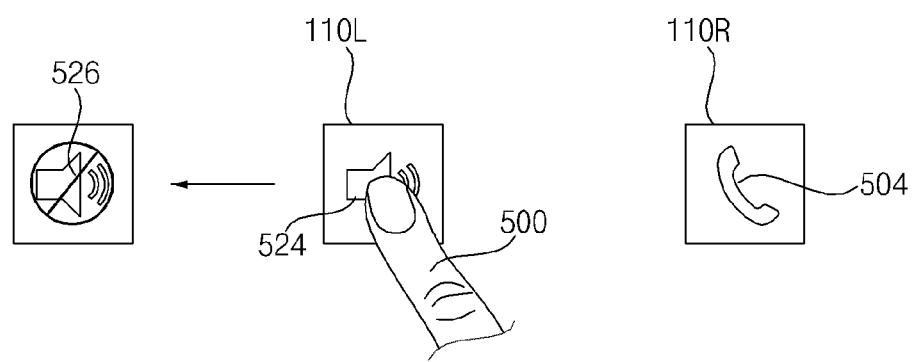

Unlike FIG. 7b, a volume control function can be next made available instead of the navigation execution function. That is, as shown in FIG. 7c, if a user's finger 500 performs a downward flicking input to the first button 110L when a music output function and an image 520 corresponding thereto are displayed on the first button 110L, and while a telephone function and an image 504 corresponding thereto are displayed on the second button 110R, an image 524 indicating a volume control function can be displayed while a volume control function is set. Next, as shown in FIG. 7d, if a user's finger performs a tap input to the first button 110L when a volume control function and an image 524 corresponding thereto are displayed on the first button 110L, and while a telephone function and an image 504 corresponding thereto are displayed on the second button 110R, an image 526 indicating a mute function can be displayed showing a mute function is set.

Figure 7E:
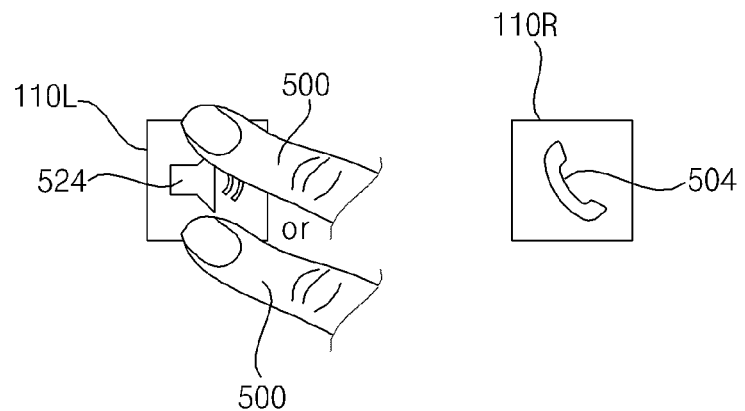
Figure 7F:
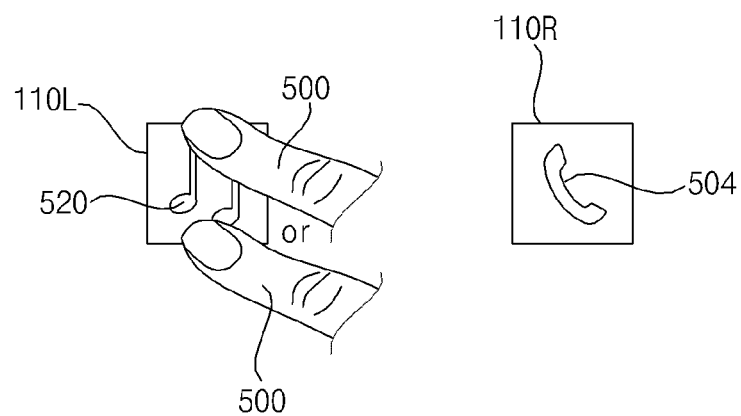
Figure 7G:
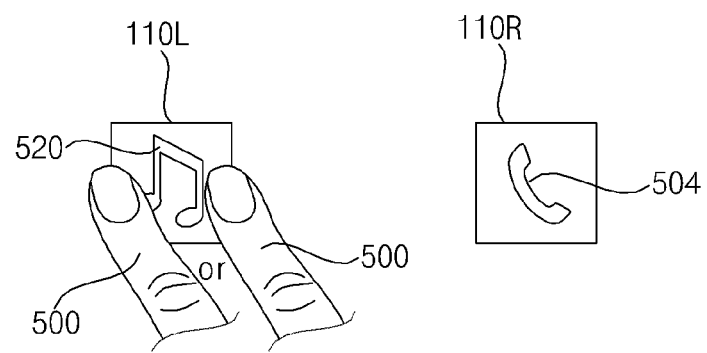

Alternatively, as shown in FIG. 7e, if a user's finger 500 performs an up or down tap input to the first button 110L when a volume control function and an image 524 corresponding thereto are displayed on the first button 110L, and while a telephone function and an image 504 corresponding thereto are displayed on the second button 110R, a function for increasing or decreasing the volume of the audio system included in the vehicle can be performed. In another alternative, as shown in FIG. 7f, if a user's finger 500 performs up or down tap input to the first button 110L using a user's finger 500 when a music output function and an image 520 corresponding thereto are displayed on the first button 110L, and while a telephone function and an image 504 corresponding thereto are displayed on the second button 110R, a function for changing a music source (or a file) can be performed. In yet another alternative, as shown in FIG. 7g, if a user's finger 500 performs left or right tap input to the first button 110L, a function for changing a music source (or a file) can be performed. Music playback speed can be changed or music play, pause or stop can be set.

As described with reference to FIGS. 5a to 7g, at least one of a menu function item, a vehicle interior function item, a music output function item, a navigation function item and a volume control item can be set under the home function item and any one of these functions can be selected by flicking input from the user. Since various functions can be set using the plurality of buttons disposed in the vehicle handle and can be performed, user convenience is increased. In reference to FIG. 4, although the images of the functions are displayed on the display 180 of the touchscreens of the first button 110L and the second button 110R, as shown in FIGS. 5a to 7g for convenience, the images corresponding to the functions of the first button 110L and the second button 110R can additionally be displayed on a heads up display near the driver's sight line or a display screen in the dash of the vehicle. Even when each of the first buttons 110L and the second button 110R does not include the touchscreen, the functions can be displayed as a display 180 on a heads-up-display (HUD) near the driver's sight line or a display screen in the dash of the vehicle.

Figure 8A:
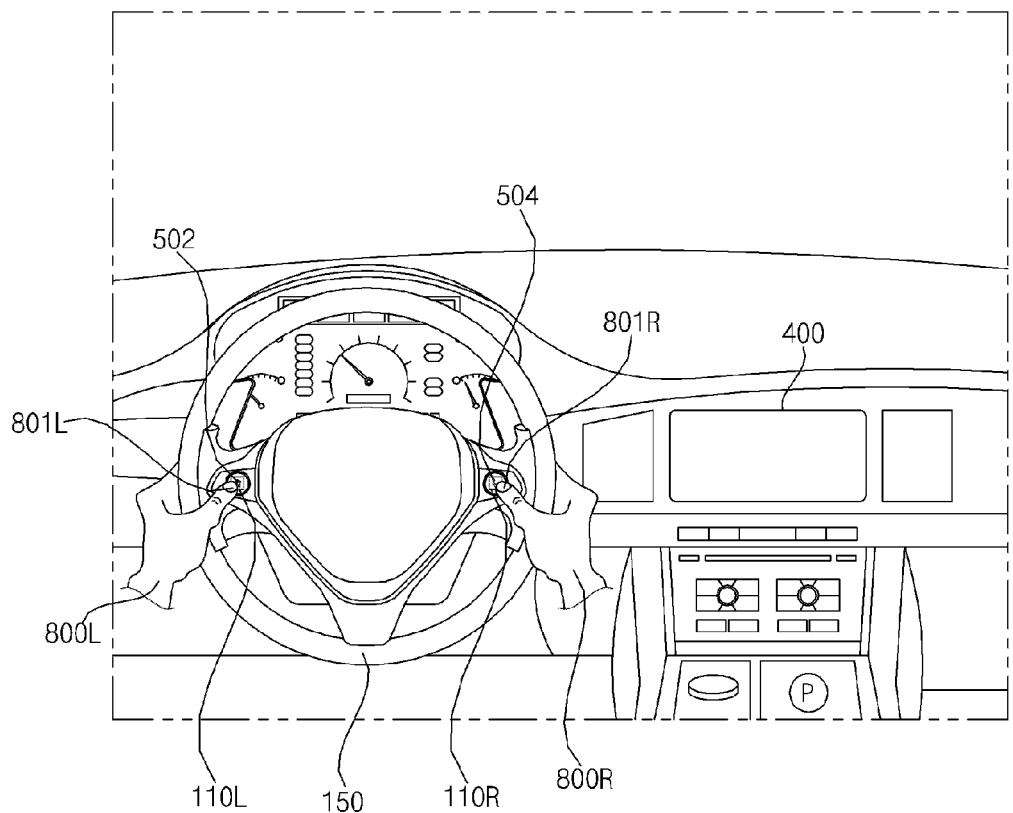
FIGS. 8a and 8b show a HUD according to a first embodiment of the invention.
Figure 8B:
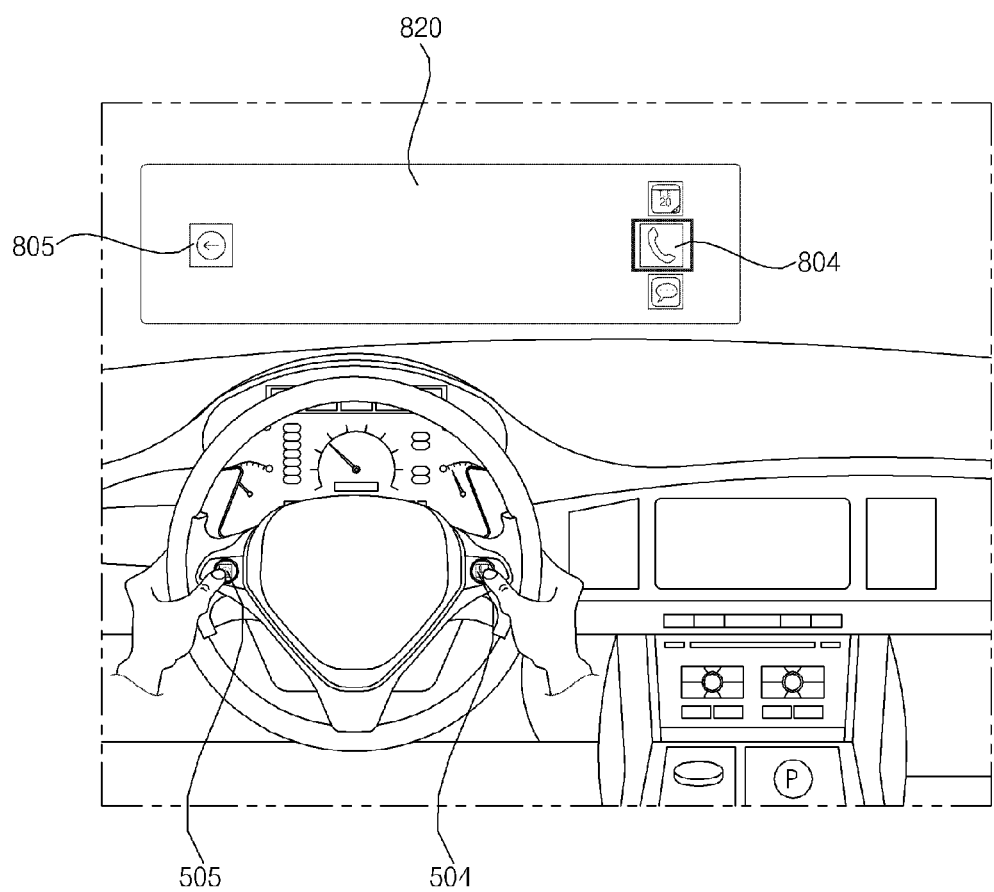

FIGS. 8a and 8b show a HUD according to a first embodiment of the invention. More particularly, FIG. 8a shows the inside of the vehicle including a first button 110L and a second button 110R disposed in a handle 150 as well as an AVN device 400. A user grips the handle 150 using both hands 800L and 800R. At this time, a left thumb 801b of the user can be located on the first button 110L and a right thumb 801R of the user can be located on the second button 110R. The user can touch at least one of the first button 110L and the second button 110R using at least one of the thumbs 801L and 801R. Similar to FIG. 5a, a home function is set on the first button 110L and an image 502 corresponding to the home function is displayed and a telephone function is set on to the second button 110R and an image 504 corresponding to the telephone function is displayed.

If the user taps the first button 110L, a menu function is set on the first button 110L and an image 805 corresponding to the menu function is displayed. Further, as also shown in FIG. 8b, a head-up display (HUD) 820 comes into view with images corresponding to the functions of the first button 110L and the second button 110R. More particularly, the HUD display 802 can display a menu image 805 set on the first button 110L and a telephone function image 804 set on the second button 110R. In addition, a messenger image, a schedule image, etc., which can be set by flicking, can be displayed. At this time, the image 804 corresponding to the currently set function is preferably highlighted unlike the messenger image and the schedule image. As shown in FIG. 8b, the size of the image 804 corresponding to the currently set function can be greater than those of the messenger image and the schedule image. By displaying the images corresponding to the functions set on the first button 110L and the second button 110R on the display 180, the user can easily confirm the set functions while looking at the road ahead. Setting of the functions of the first button 110L and the second button 110R can be changed in correspondence with a vehicle movement environment in addition to user manipulation.

Figure 9A:
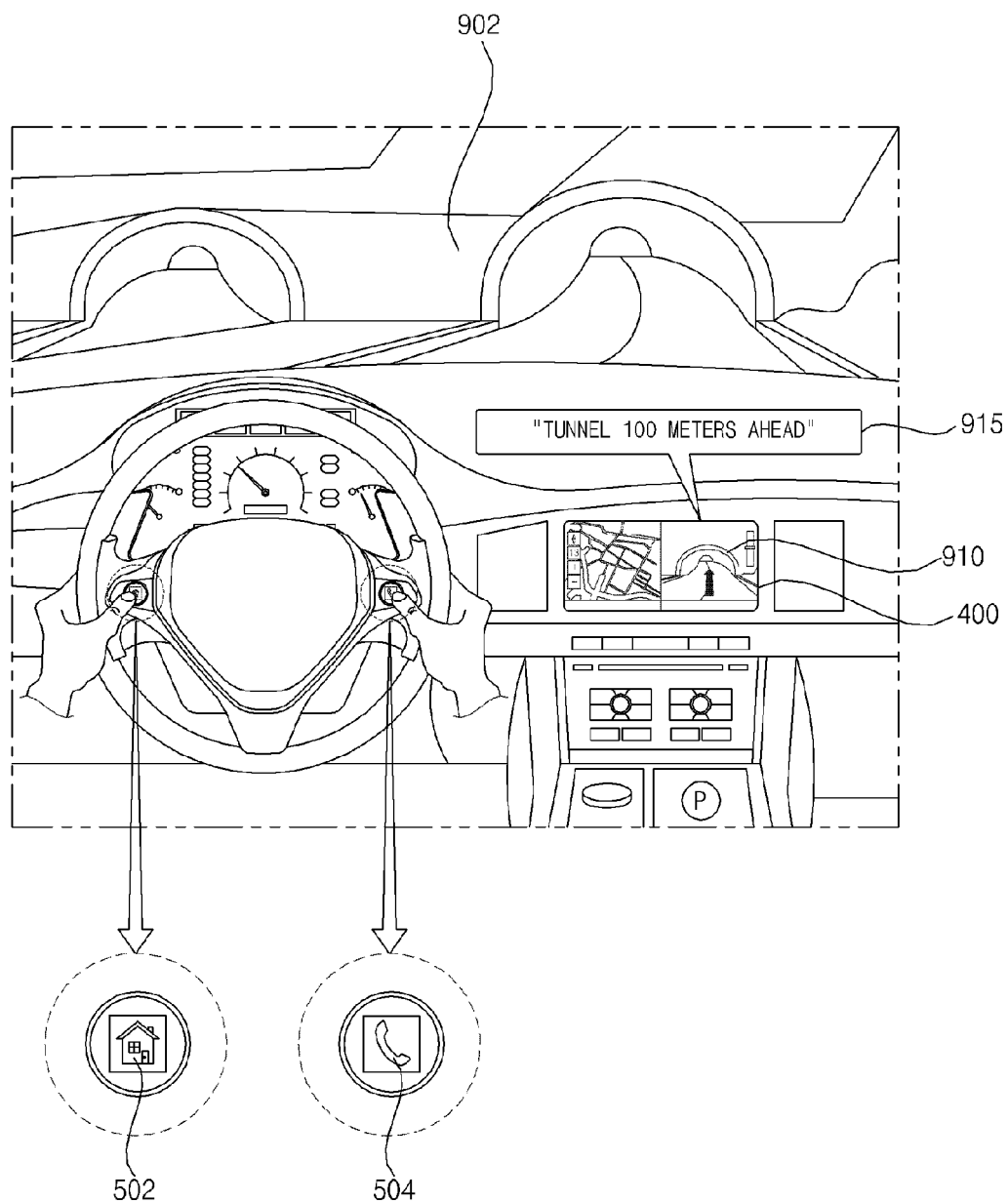
FIGS. 9a to 9d show a case in which the functions change due to a change in vehicle movement environment according to an embodiment of the invention.

FIGS. 9a to 9d show a case in which the functions change due to a change in vehicle movement environment according to a first embodiment of the invention. More specifically, FIGS. 9a to 9d show a case in which the function of a button changes when a vehicle enters a tunnel as an example of a change in vehicle movement environment. FIG. 9a shows the case in which the home function and the telephone function are respectively set on the first button 110L and the second button 110R and images 502 and 504 corresponding thereto are displayed. The AVN device 400 can display a navigation screen 910 and can output sound 915 indicating entrance into a tunnel. Further, the input device 200a, as shown in FIG. 4, can receive GPS information or tunnel entrance information from the AVN device 400.

If the input device 200a receives GPS information from the AVN device 400 via the interface 130, the processor 170 of the input device 200a can confirm whether the vehicle enters the tunnel. When the input device 200a receives tunnel entrance information from the AVN device 400 via the interface 130, the processor 170 of the input device 200a can immediately set the second button to a vehicle window closing function to tunnel mode. Thus, while in tunnel mode, a second button can be set to a vehicle window closing function.

Figure 9B:
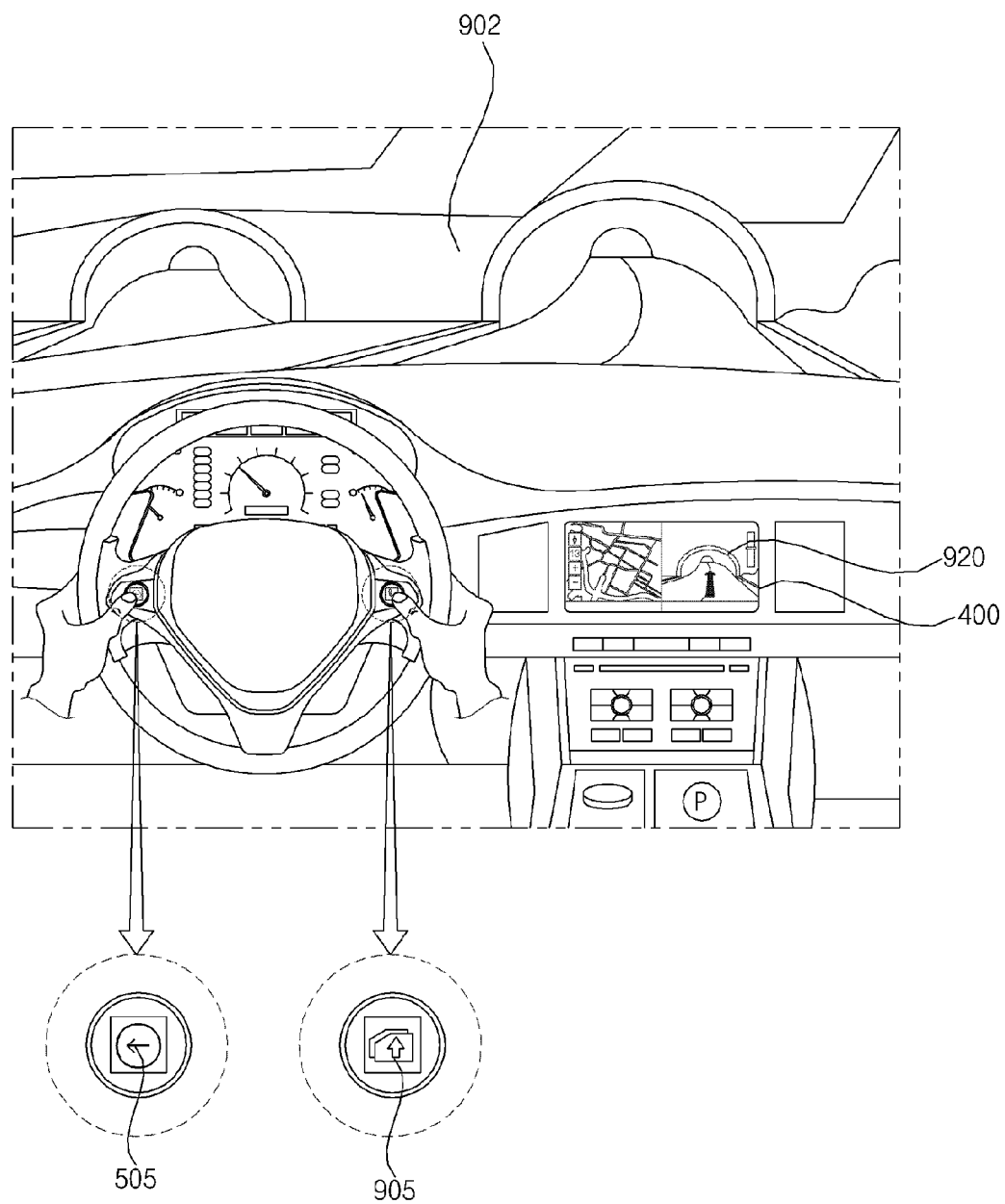

FIG. 9b shows the vehicle just before entering the tunnel with a front view 902 of the vehicle. At this time, the menu function and the vehicle window closing function are respectively set on the first button 110L and the second button 110R and images 505 and 905 corresponding thereto are displayed. During the tunnel mode, if the user taps the second button 110R with image 905, all windows of the vehicle will close. Accordingly, the user can easily control all windows using only one button.

Figure 9C:
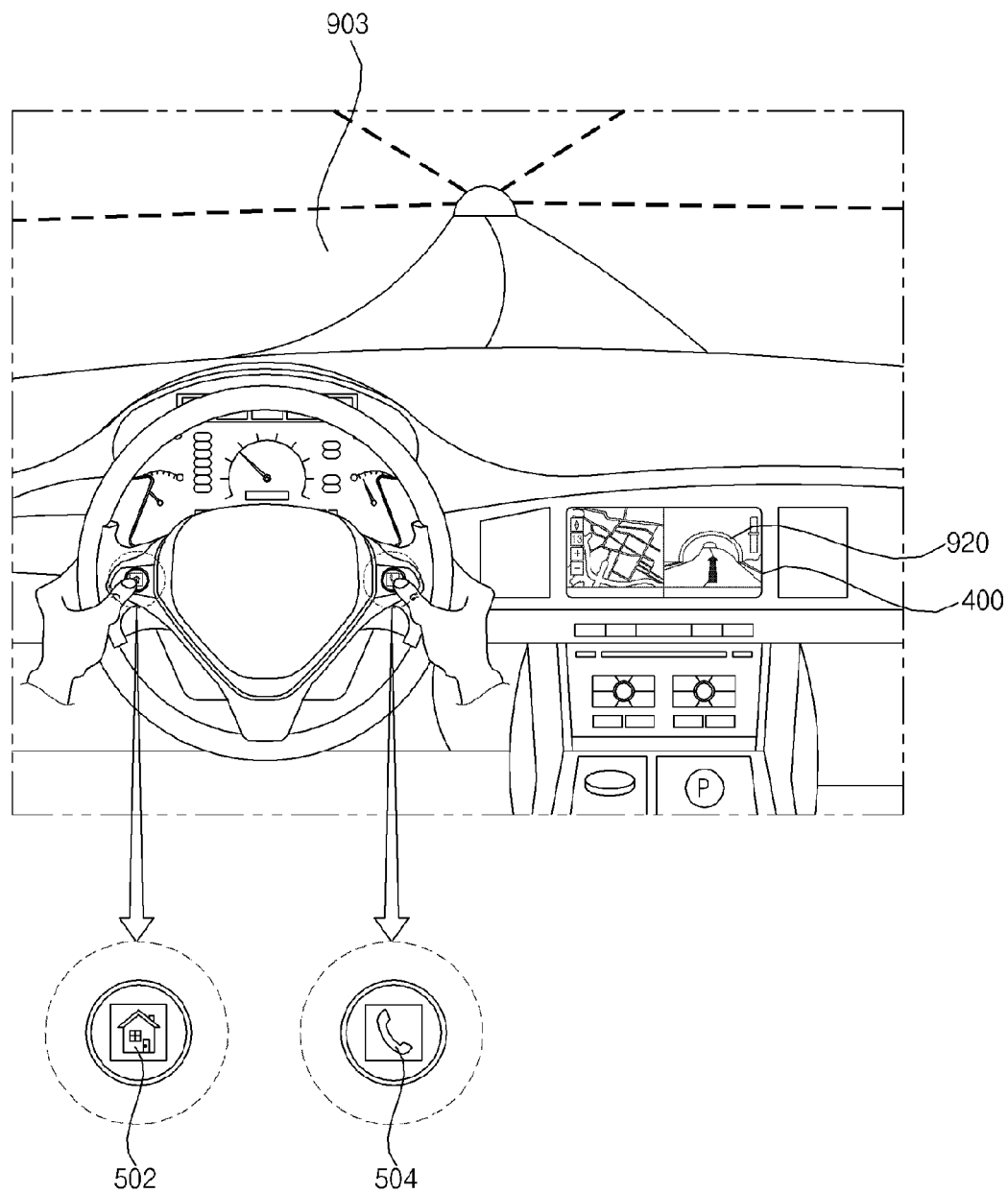

FIG. 9c shows the vehicle inside the tunnel with a front view 903 of the vehicle. The functions of the first button 110L and the second button 110R change again when the vehicle is passing through the tunnel and the windows are closed. That is, since all the windows of the vehicle are closed, the home function and the telephone function, which are the original functions of the buttons, can be set again such that the images 502 and 504 corresponding thereto can be displayed.

Figure 9D:
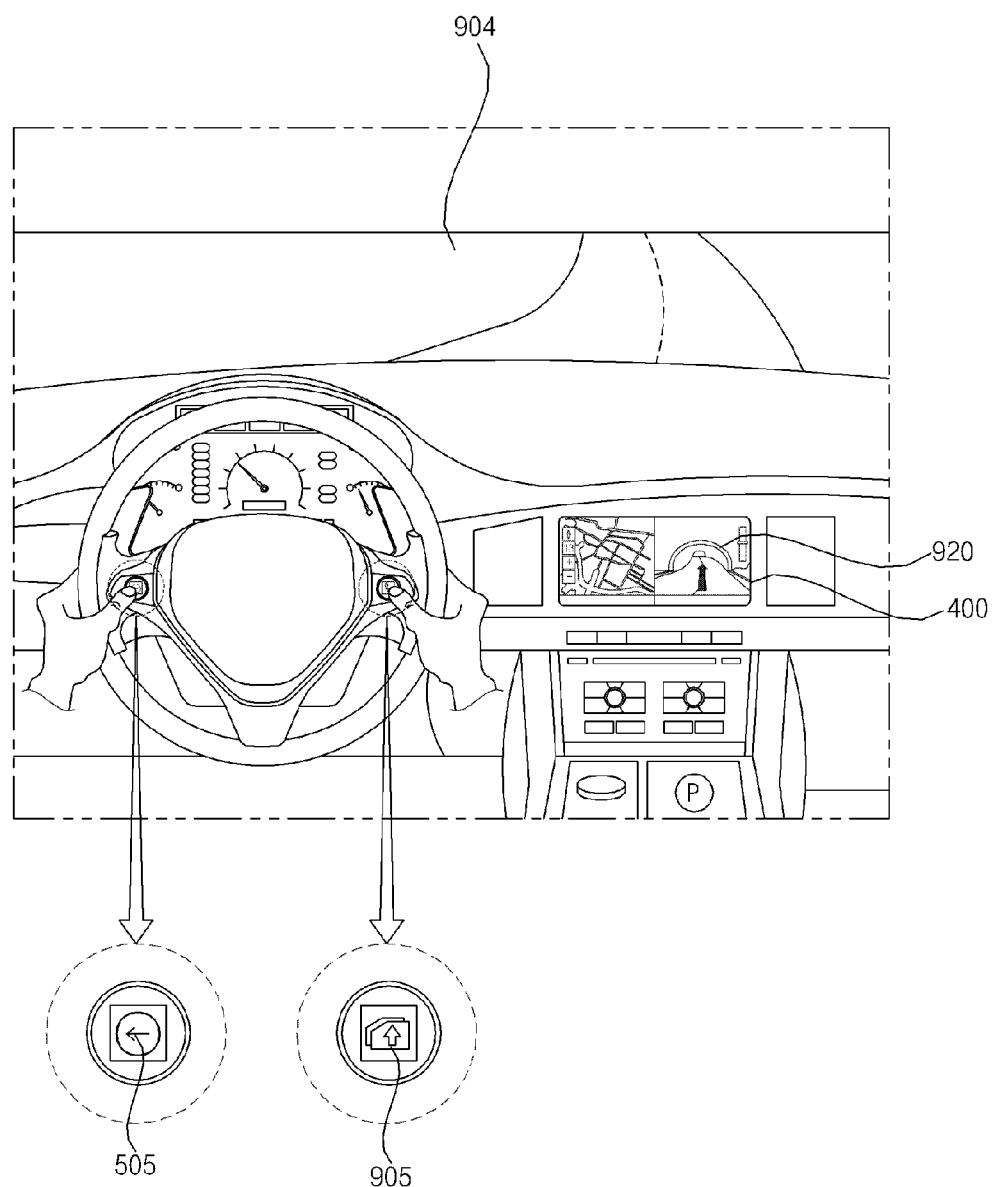

FIG. 9d shows the vehicle exiting the tunnel with a front view 904 of the vehicle. The functions of the first button 110L and the second button 110R can be changed yet again after the vehicle exits the tunnel. That is, the menu function and the vehicle window opening function are respectively set on the first button 110L and the second button 110R and the images 505 and 905 corresponding thereto are displayed. At this time, if the user taps the second button 110R, all the windows of the vehicle are opened. Accordingly, the user can easily control all windows using only one button.

In the input device according to the first embodiment described with reference to FIGS. 5a to 9d, a touchscreen type button has been focused upon. Instead of the touchscreen type button, the function changes described with reference to FIGS. 5a to 9d are also applicable for use with a pressable mechanical button that also includes four-direction rocking. In another example, a pressable roller ball can also be used.

Figure 10:
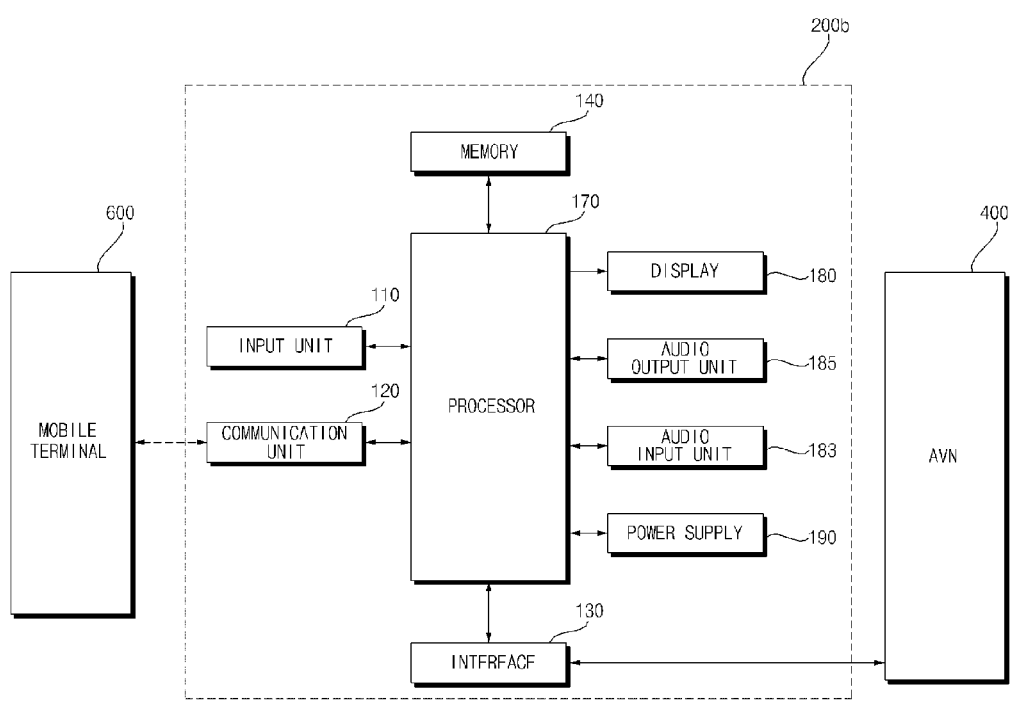
FIG. 10 is a block diagram of an input device disposed in a handle according to a second embodiment of the invention.

FIG. 10 is a block diagram of an input device disposed in a handle according to a second embodiment of the invention. The input device 200b according to the second embodiment includes the functionality of the input device 200a according to the first embodiment but is different therefrom in that a communication unit 120 is further included. Referring to FIG. 10, the input device 200b disposed in the handle 150 according to the second embodiment of the invention may include an input unit 110, a communication unit 120, an interface 130, a memory 140, a processor 170, a display 180, an audio input unit 183, an audio output unit 185 and a power supply 190. Hereinafter, only the communication unit 120 will be described.

The communication unit 120 can wirelessly exchange data with an electronic apparatus or a server (not shown) disposed in the vehicle. In particular, the communication unit 120 can exchange data with a mobile terminal of a vehicle driver wirelessly. As a wireless data communication method, various data communication methods such as Bluetooth, WiFi Direct, APIX, etc. are possible. However, hereinafter, for the purpose of describing the invention, Bluetooth will be focused upon. If a user enters a vehicle, the mobile terminal 600 of the user and the input device 200b can be paired automatically or by executing an application by the user. In particular, the processor 170 can perform pairing with the mobile terminal 600 via the communication unit 120, identify the user of the mobile terminal 600 based on user information or device information of the mobile terminal 600 received via pairing, and set a function corresponding to the user of the mobile terminal 600 on at least one of a plurality of buttons. If the user has edited the functions of the input device in advance, the processor 170 can receive the functions of the input device, which has been edited by the user in advance, from the mobile terminal 600 via the communication unit 120 and set the functions. Accordingly, functions of the input device 200b can be set on a per user basis.

If a user changes a function of a button of a plurality of buttons, the processor 170 changes the function of the button to the function designated by the user. That is, the processor 170 not only control changes functions of the plurality of buttons based on external environment information or vehicle state information but also primarily controls changes based on a manipulation signal from the input unit. If a manipulation signal, external environment information and vehicle state information are all received at the same time within a predetermined period of time, priority is assigned to the manipulation signal. FIGS. 11a to 19c are views referred to for describing operation of the input device according to the second embodiment of FIG. 10.

Figure 11A:
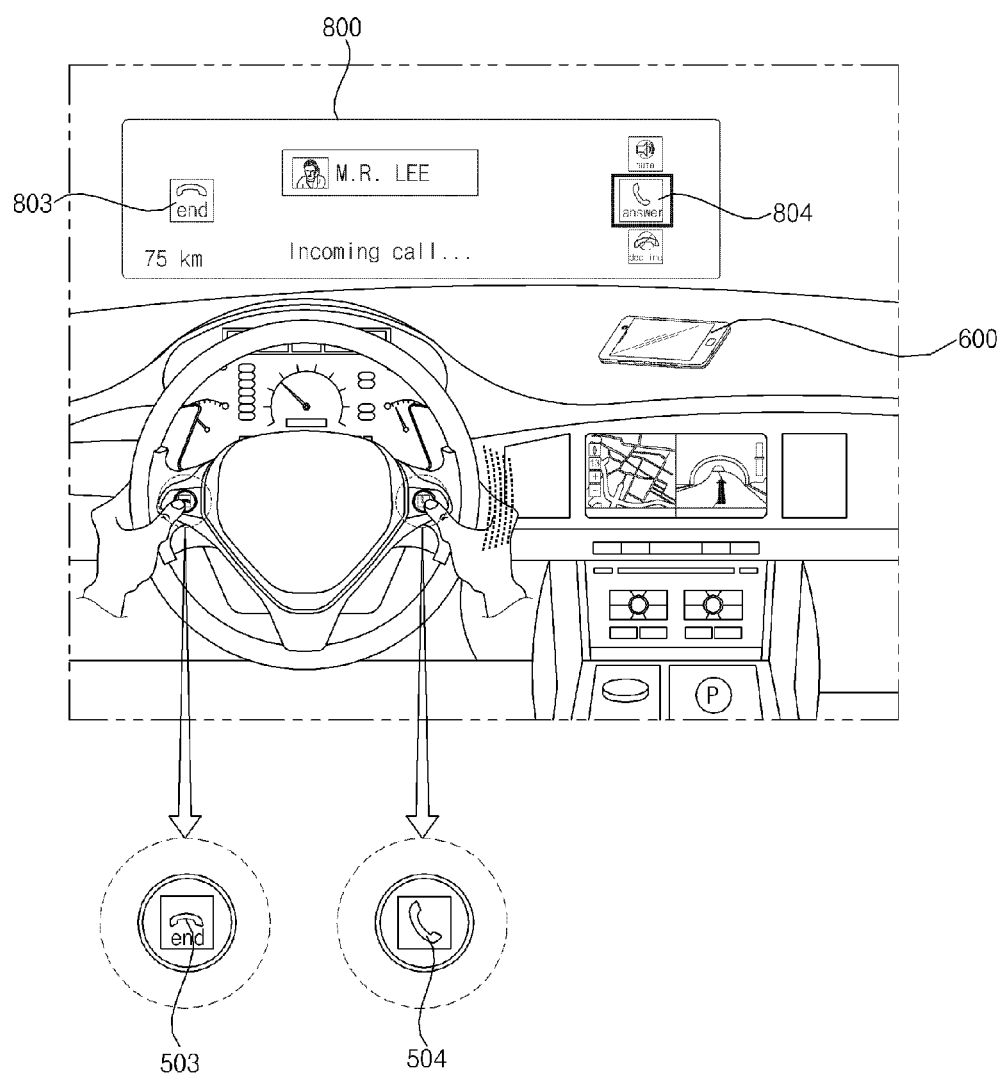
FIGS. 11a and 11b show a Head-up-Display (HUD) for receiving a phone call according to a second embodiment of the invention.
Figure 11B:
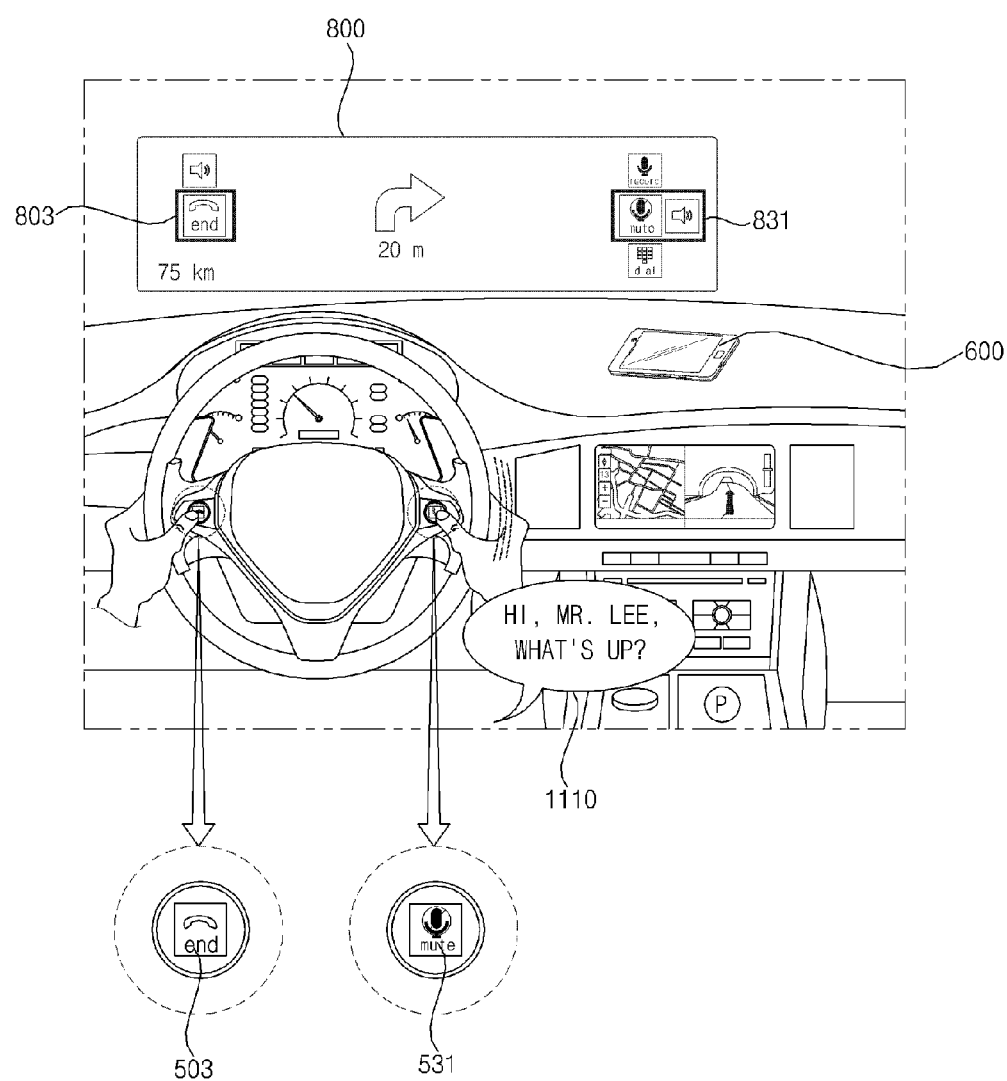

FIGS. 11a and 11b show a HUD for receiving a phone call according to a second embodiment of the invention. As shown in FIG. 11a, when a mobile terminal 600 of a user is placed in a vehicle, after pairing to the input device 200b, as shown in FIG. 10, and the mobile terminal 600, an incoming call can be received via a mobile terminal 600. If an incoming call is received via the mobile terminal 600, the input device 200b can receive call reception information. The processor 170 of the input device 200b sets the first button 110L to a ring-off function and the second button 110R to a call reception function. Accordingly, on the first button 110L and the second button 110R with images 503 and 504 respectively corresponding thereto can be displayed. At this time, the processor 170 can control a vibration unit (not shown) to vibrate the second button 110R having the call reception function. The HUD 800 can also display the images corresponding to the set functions. As shown in FIG. 11a, a ring-off function image 803 and a call reception function 804 are displayed in the HUD 800. Meanwhile, the name, telephone number information, etc. of a person who makes a call can be displayed and the current speed information of the vehicle can be displayed in the HUD 800. If the user taps the second button 110R, the user can receive the incoming call. In addition, telephone conversation content can be output via the audio output unit 185, as shown in FIG. 10.

FIG. 11b shows the case in which a ring-off function is set on the first button 110L and a mute function is set on the second button 110R. Accordingly, on the first button 110L and the second button 110R along with images 503 and 531 respectively corresponding thereto can be displayed. In addition, a ring-off function image 803 and a mute function image 831 can be displayed in the output area 800. The audio output unit 185, as shown in FIG. 10, can output telephone conversation content received via the mobile terminal 600 as sound and the audio input unit 183, as shown in FIG. 10, can receive voice 1110 input via a microphone. The received voice can be sent to the other party via the mobile terminal 600. Since the user can have telephone conversation via the input device 200b, as shown in FIG. 10, while gripping the handle, user convenience and safety is increased.

Figure 12A:
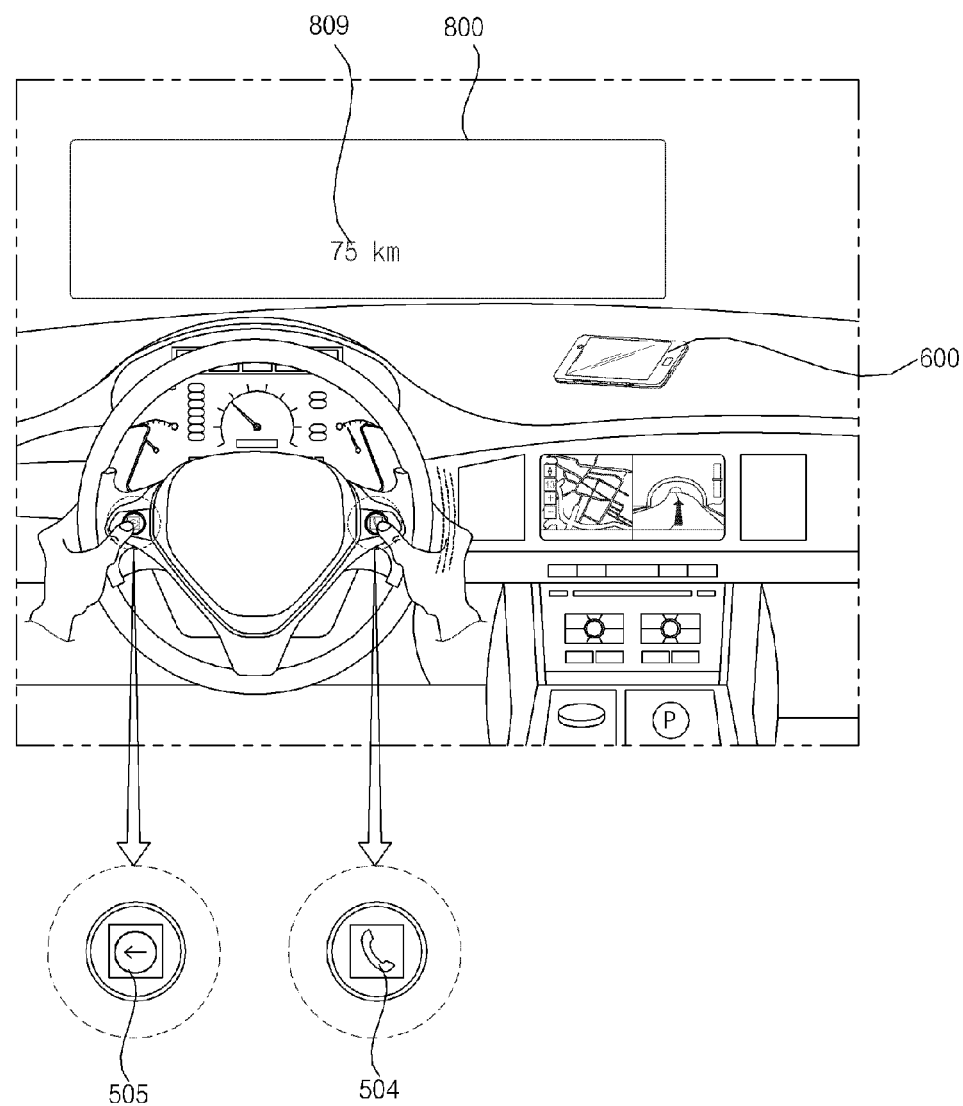
FIGS. 12a and 12b show a HUD for placing a phone call according to a second embodiment of the invention.
Figure 12B:
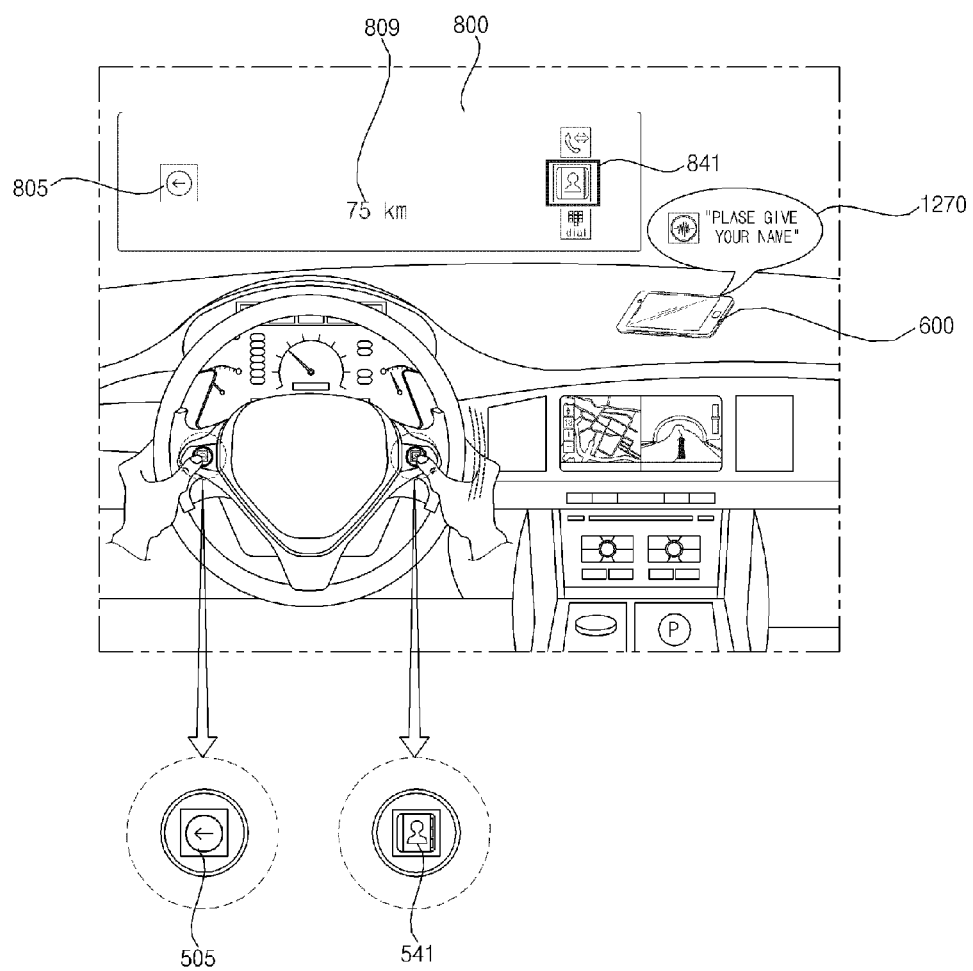

FIGS. 12a and 12b show a HUD for placing a phone call according to a second embodiment of the invention. As shown in FIG. 12a, the first button 110L is set to a menu function with image 505 and the second button 110R are set to a telephone function with image 504 when the mobile terminal 600 of the user is placed in the vehicle. At this time, current vehicle speed information 809 can be displayed in the HUD 800.

When the user taps the second button 110R, as shown in FIG. 12b, a contact function item is set on the second button 110R and an image 541 corresponding thereto can be displayed. Further, a menu image 805, a contact image 841 and current speed information 809 are displayed in the HUD 800. At this time, if the user taps the second button 110R, on which the contact function is displayed, the mobile terminal 600 can output voice 1270 "Please give your name".

Figure 13A:
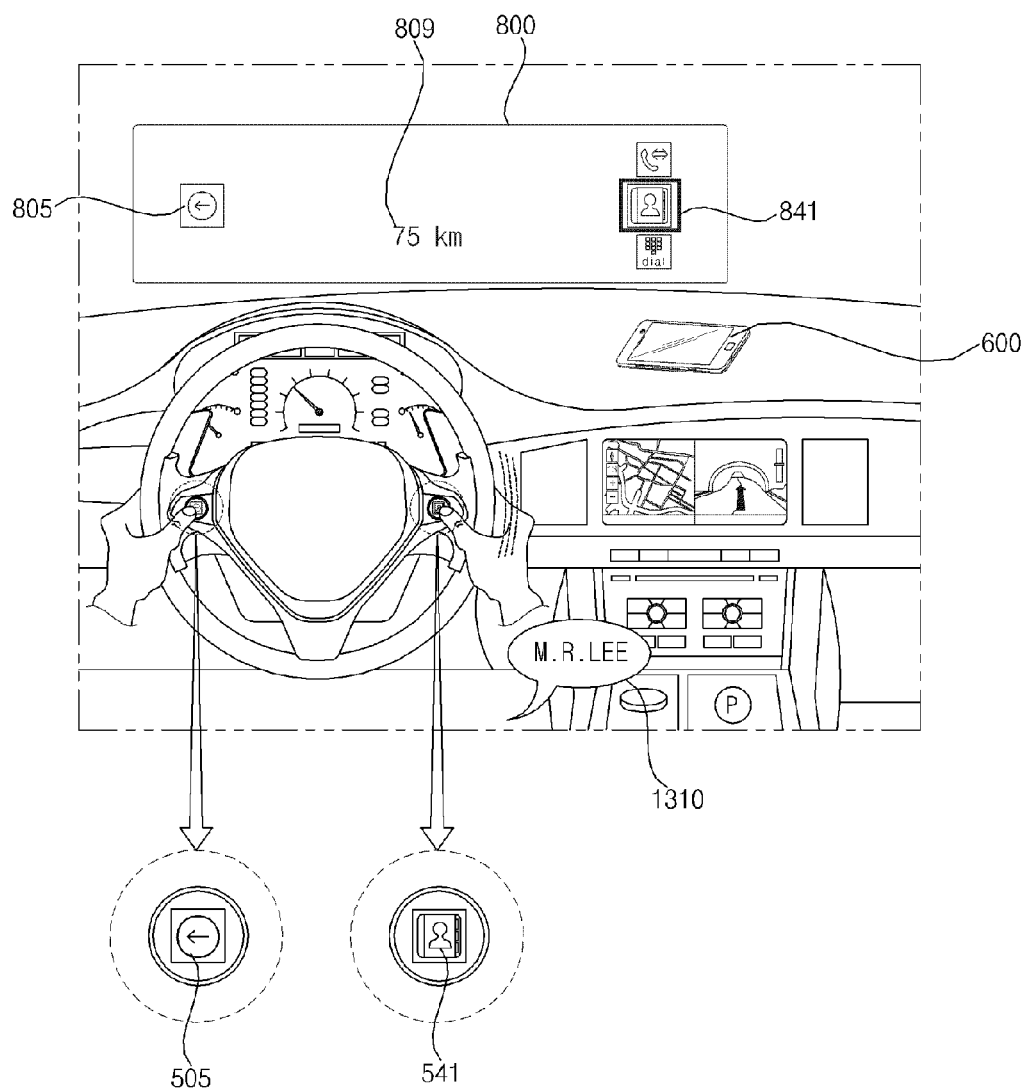
FIGS. 13a and 13b show a HUD for voice requesting a phone call by name according to a second embodiment of the invention.
Figure 13B:
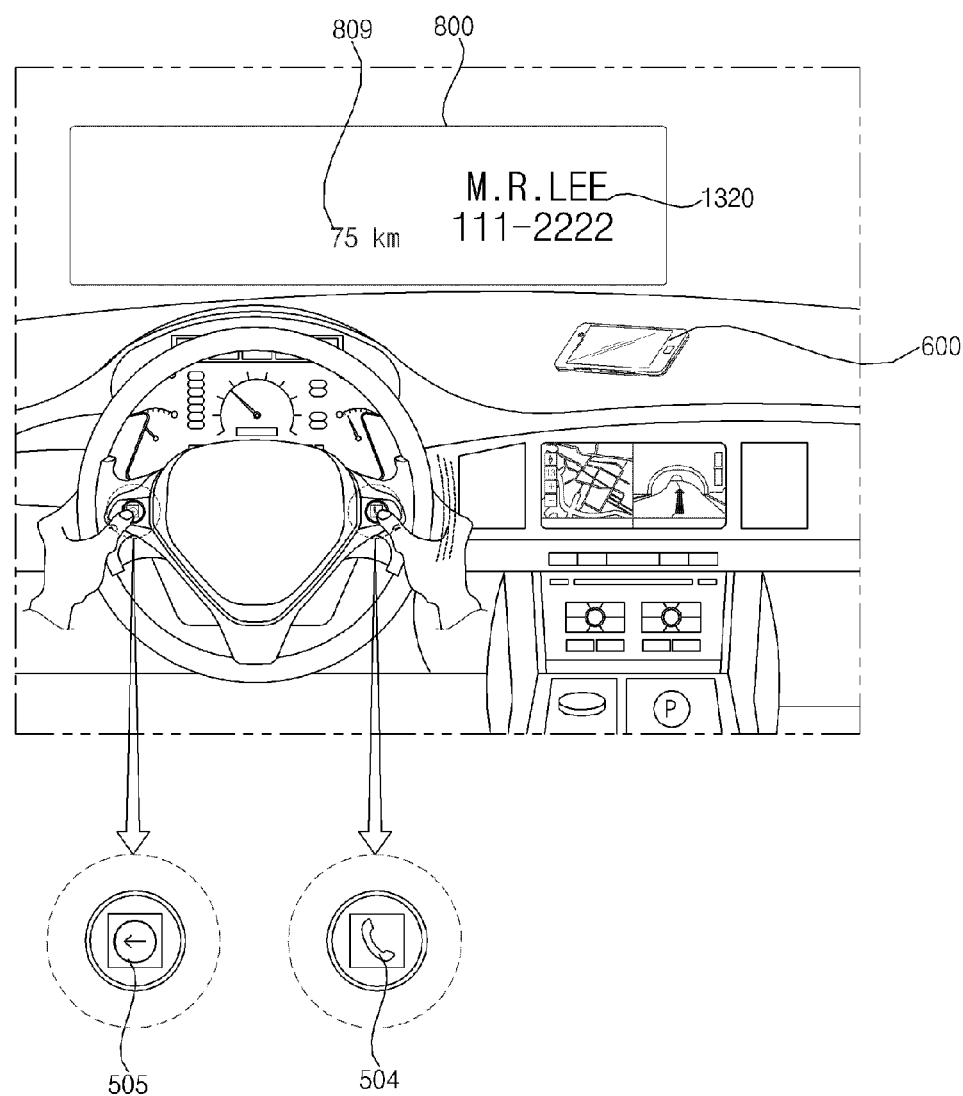

FIGS. 13a and 13b show a HUD for voice requesting a phone call by name according to a second embodiment of the invention. As shown in FIG. 13a, the first button 110L is set to a menu function with image 505 and the second button 110R are set to a contact function with image 541 when the mobile terminal 600 of the user is placed in the vehicle. Upon a tap input to the second button 110R having a contact function, a user's voice 1310 calls the name of a specific person. The input device 200b, as shown in FIG. 10, receives the name through the audio input unit 183, as shown in FIG. 10, and transmits the voice to the mobile terminal 600. Then, the input device 200b, as shown in FIG. 10, receives contact information corresponding to the voice from the mobile terminal 600. The processor 170, as shown in FIG. 10, controls output of the received contact information to the display 180, as shown in FIG. 10, which is the HUD 800.

As shown in FIG. 13b, contact information 1320, such as the name, telephone number information, etc. of the specific person, is displayed in the output area 800, in addition to the current vehicle speed information 809. Accordingly, the user may easily confirm contact information of a desired user while driving the vehicle. Alternatively, unlike FIGS. 13a and 13b, call origination can be performed by speaking a telephone number.

Figure 14A:
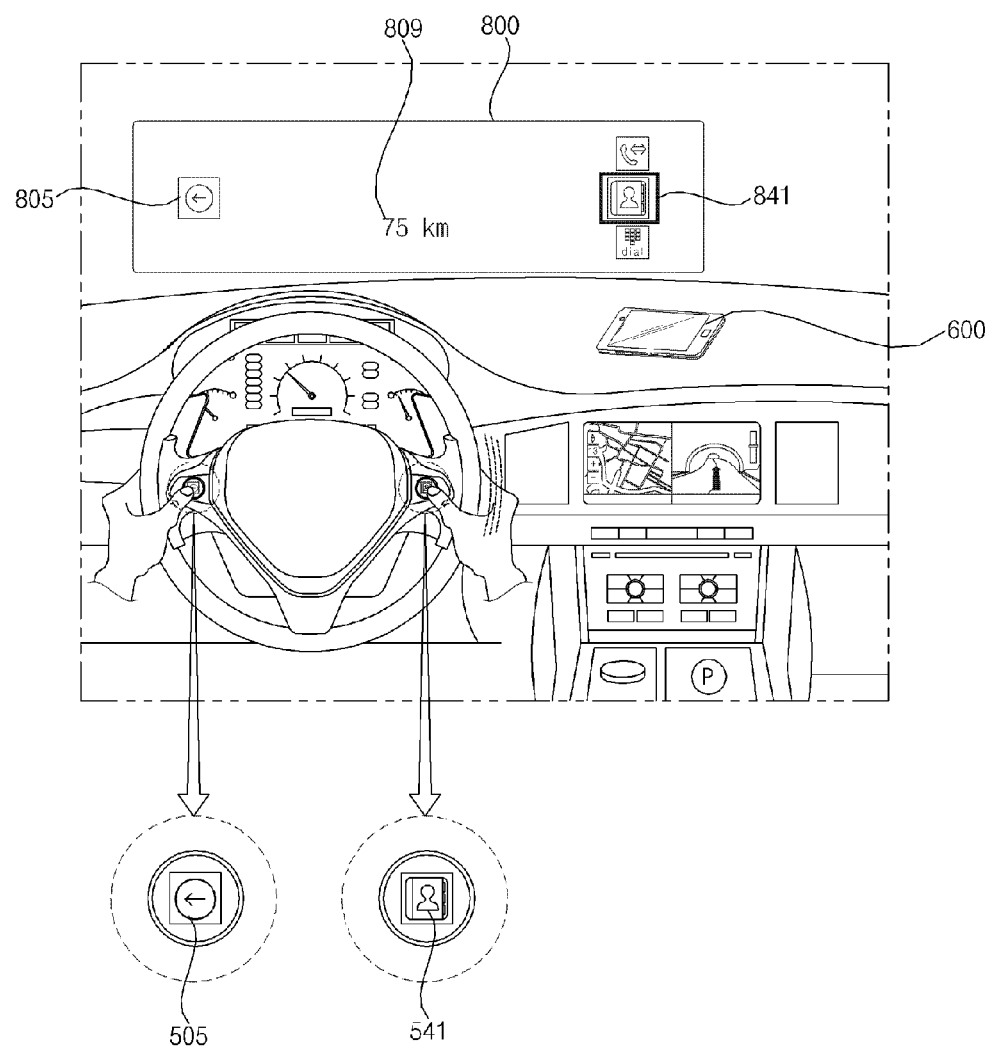
FIGS. 14a and 14b show a HUD for voice requesting a phone call by number according to a second embodiment of the invention.
Figure 14B:
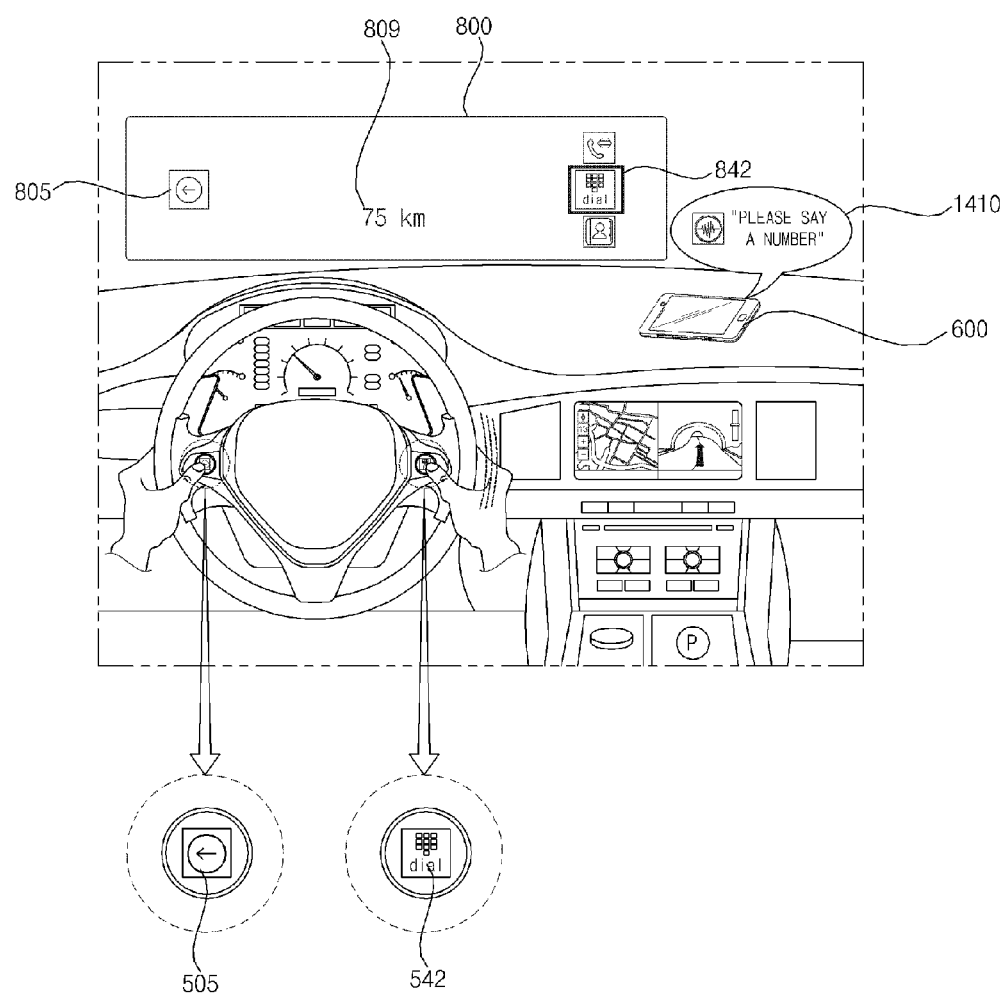

FIGS. 14a and 14b show a HUD for voice requesting a phone call by number according to a second embodiment of the invention. The user can tap the second button 110R when the first button 110L is set to a menu function and the second button 110R are set to a contact function. As a result of a tap on the second button 110R set to a contact function, a dial function is set on the second button 110R, which is a sub-function of the contact function.

FIG. 14b shows the case in which the first button 110L is set to the menu function with image 505 displayed thereon and the second button 110R is set to the dial function with image 542 displayed thereon. In the output area 800, the menu function image 805 and dial function image 842 can be displayed along with the current speed information 809. If the dial function is set, the input device 200b, as shown in FIG. 10, can transmit dial function setting information to the mobile terminal 600 and the mobile terminal 600 can output sound 1410 "Please say a number". Accordingly, the user can conveniently perform call origination by saying only a number. That is, call origination can be performed via the input device 200b, as shown in FIG. 10, without directly manipulating the mobile terminal 600.

Figure 15:
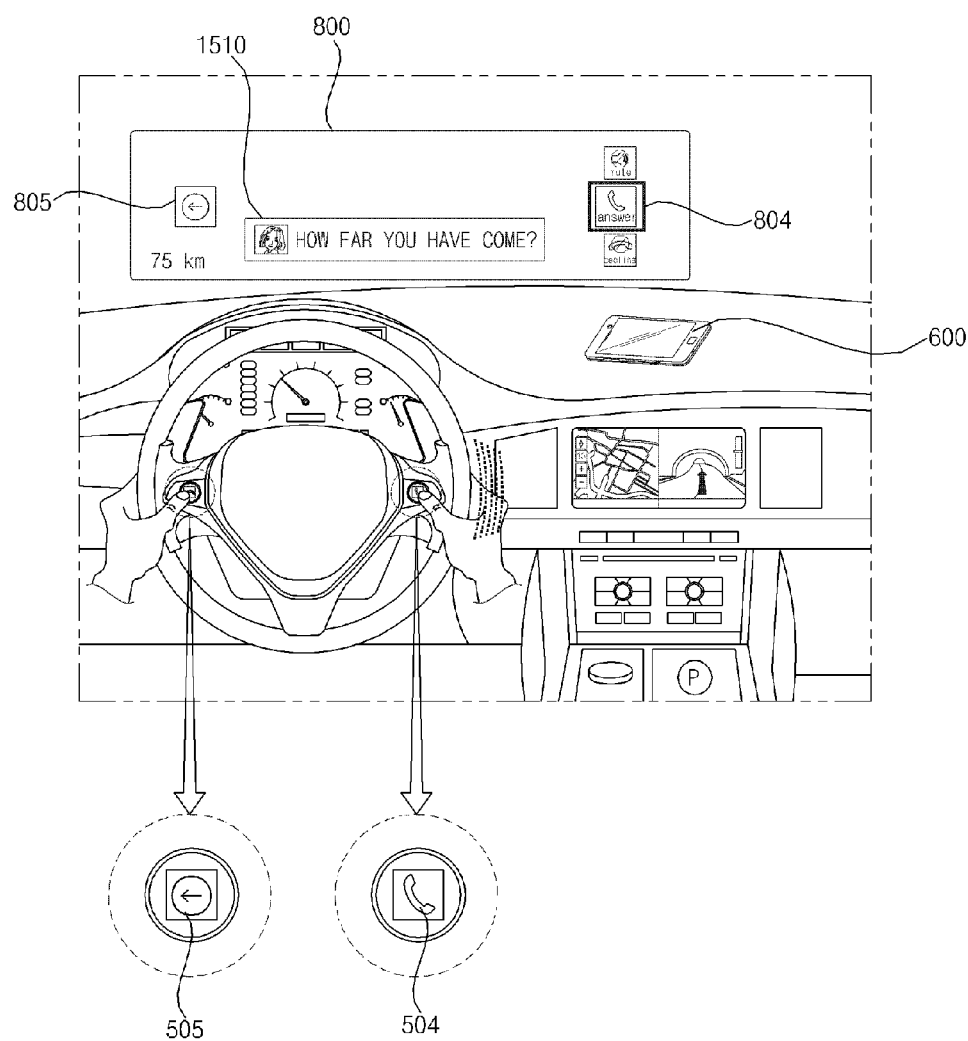
FIG. 15 shows reception of a message according to a second embodiment of the invention.

FIG. 15 shows reception of a message according to a second embodiment of the invention. When the first button 110L of the input device is set to a menu function and the second button 110R are set to a telephone function, if a text message is received via the mobile terminal 600, the input device 200b can receive the text message. Accordingly, the processor 170 can control a vibration unit (not shown) to vibrate the second button 110R having the telephone function. If the user presses the second button 110R, that is, if the user taps the second button 110R, the received text message information 1510 can be displayed in the output area 800 via the display 180. Accordingly, the user can conveniently confirm the text message received via the mobile terminal while driving the vehicle in a state of gripping the vehicle handle.

Figure 16A:
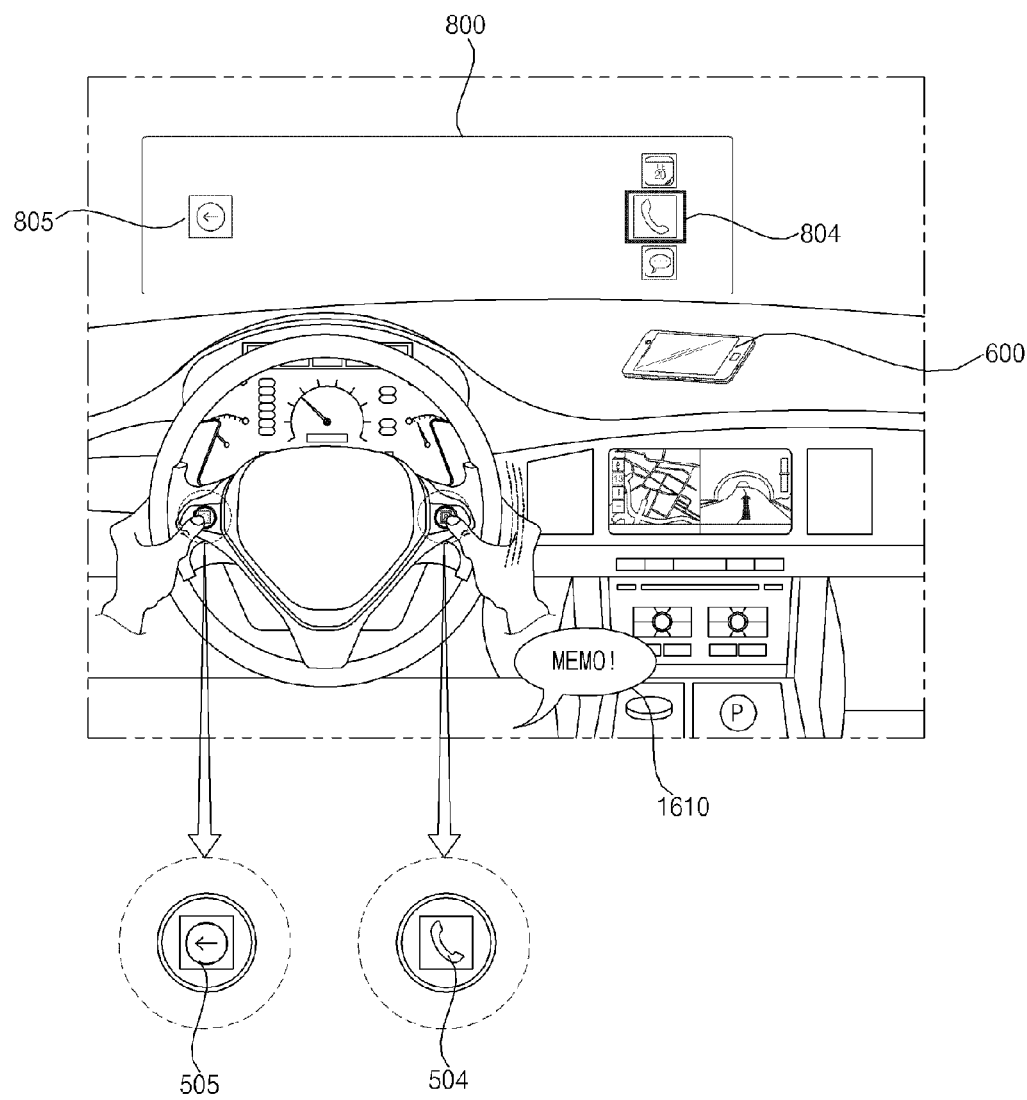
FIGS. 16a to 16d show storage of a voice memo according to the second embodiment of the invention.
Figure 16B:
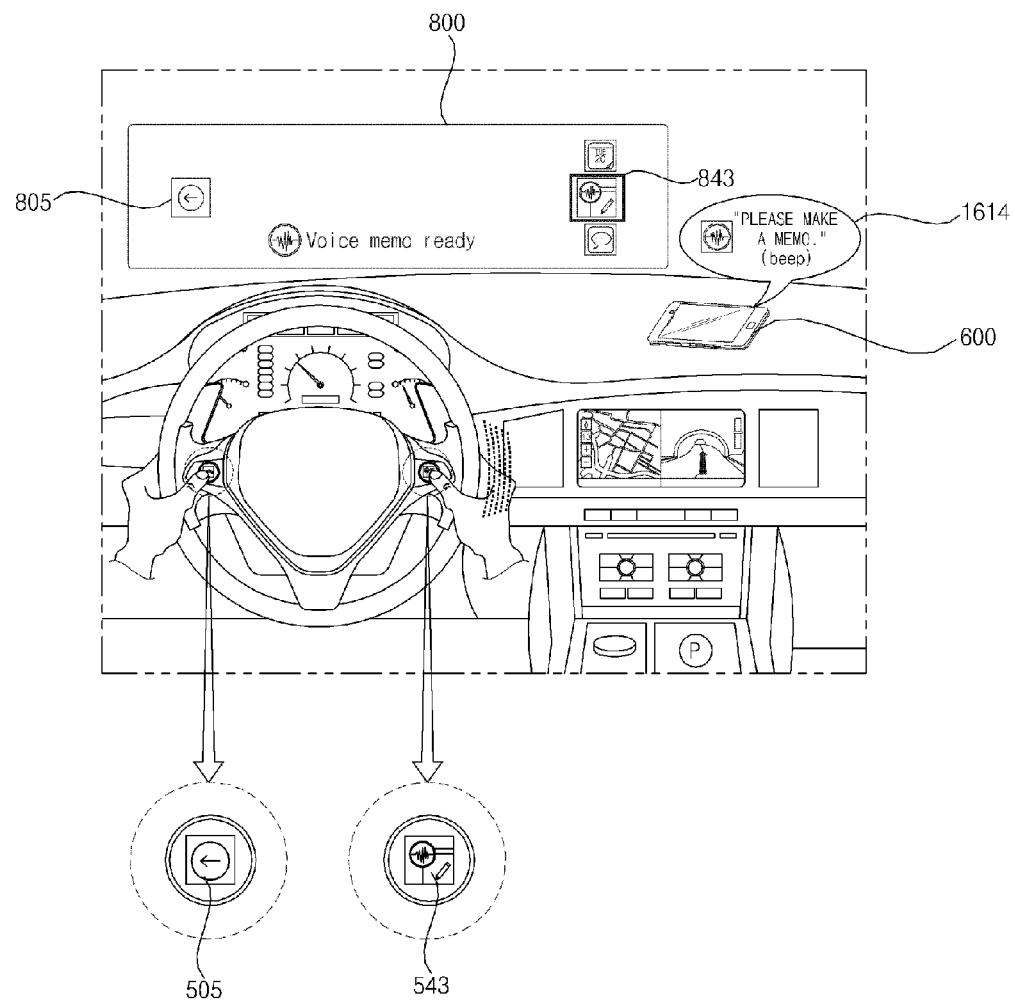

FIGS. 16a to 16d show storage of a voice memo according to the second embodiment of the invention. More specifically, FIG. 16a shows the case in which a user outputs voice "memo" when the first button 110L is set to a menu function and the second button 110R are set to a telephone function. The audio input unit 183 of the input device 200b receives the voice and the communication unit of the input device 200b transmits the received voice information to the mobile terminal 600. Based on the voice input of the audio input unit 183 or if the user presses the second button, as shown in FIG. 16b, a voice memo function is set on the second button 110R and an image 543 corresponding thereto can be displayed. As shown in FIG. 16b, the voice memo function can be activated such that the mobile terminal 600 can output a voice message 1614 "Please make a memo". Information "voice memo ready" indicating a voice memo ready state can be displayed in the output area 800 of the input device 200b.

Figure 16C:
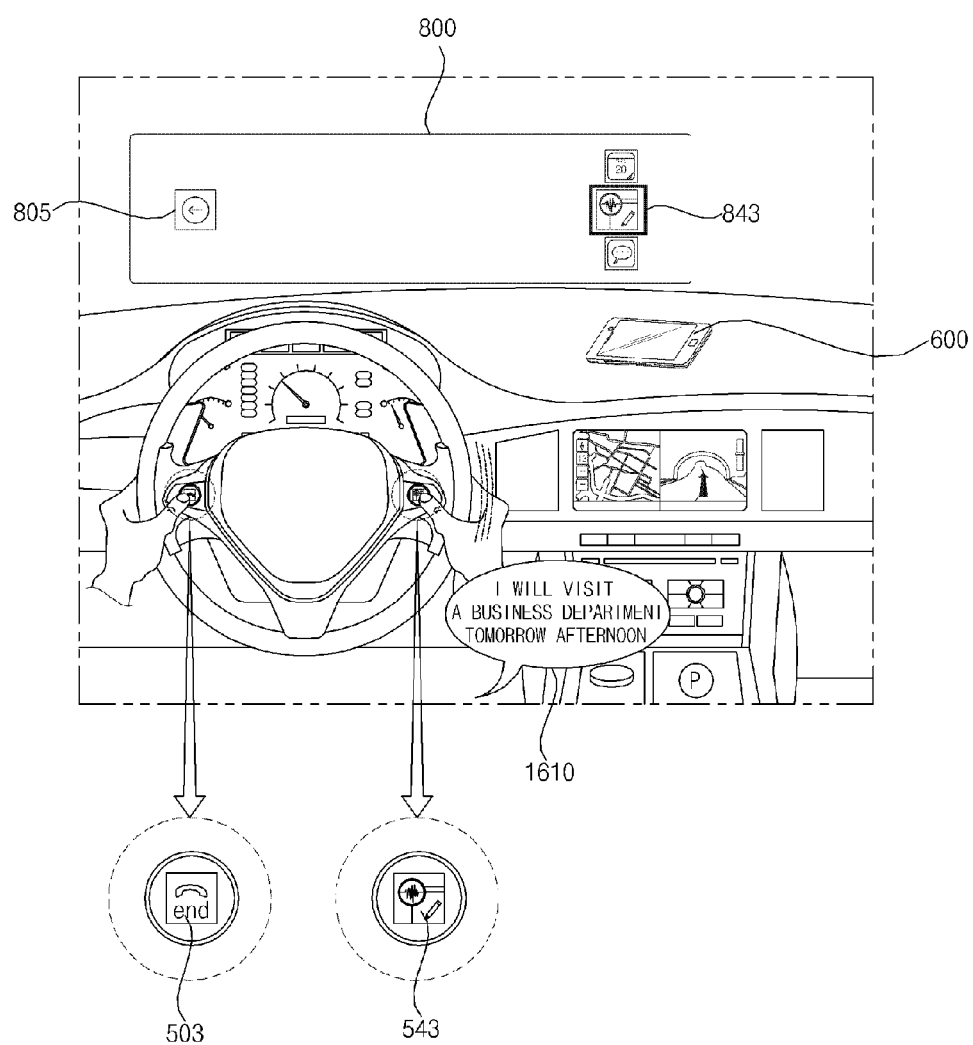
Figure 16D:
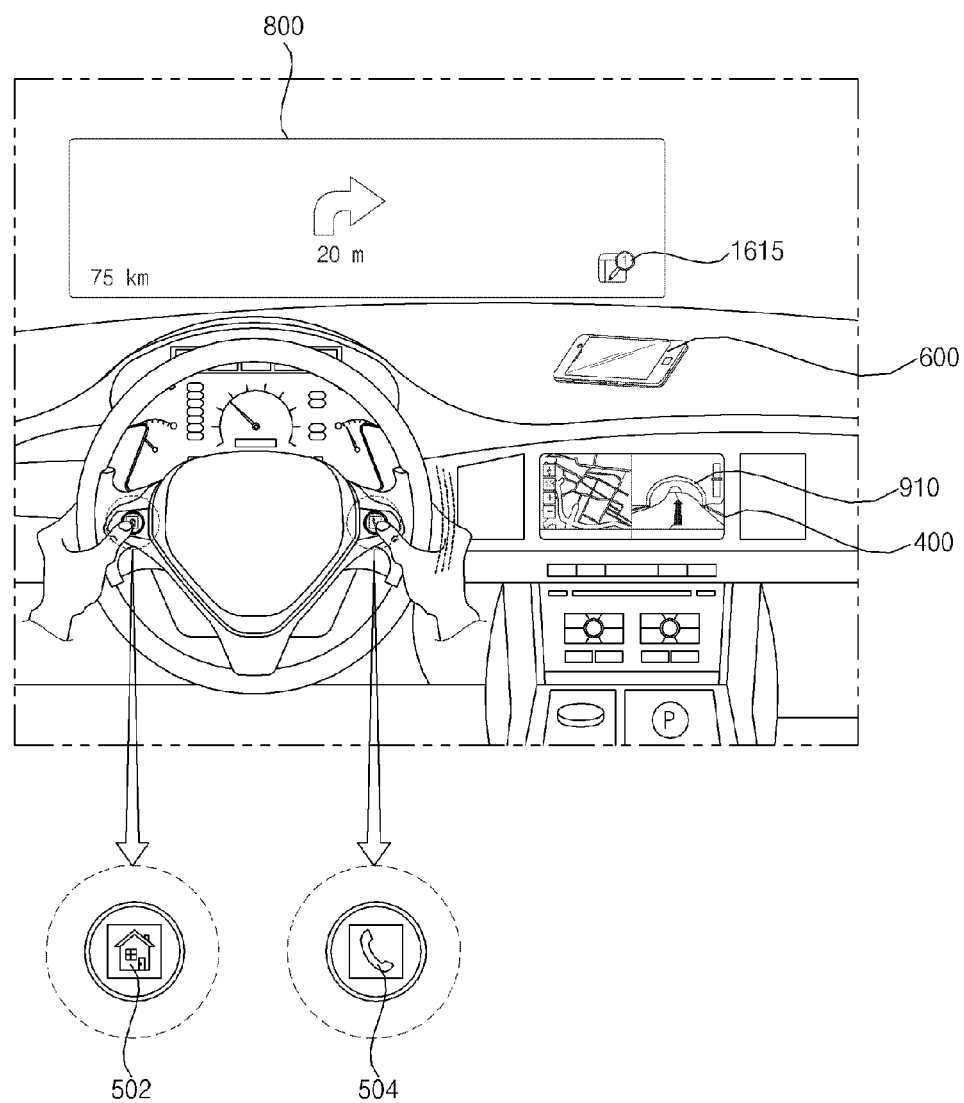

As shown in FIG. 16c, if a user outputs a voice memo 1610 "I will visit a business department tomorrow afternoon", the audio input unit 183 of the input device 200b receives the voice memo and the communication unit 120 of the input device 200b transmits the received voice memo to the mobile terminal 600. The mobile terminal 600 stores the received voice memo and transmits a storage complete message to the input device 200b. The input device 200b can display a voice memo storage complete message 1615 in the output region 800. The input device 200b can display the voice memo storage complete message 1615 in the output region 800 if the audio input unit 183 receives the voice memo, regardless of reception of the voice memo storage complete message from the mobile terminal.

If any one of the plurality of buttons is manipulated when the vehicle handle rotates by a predetermined angle or more, the processor 170 of the input device 200b can not generate a manipulation signal of the button. That is, the function can not be changed or activated. The processor 170 can receive steering information of the vehicle handle from the ECU of the vehicle via the interface 130. If at least one of the first button 110L and the second button 110R is manipulated when the vehicle handle is rotated at a predetermined angle or more, the manipulation signal of the button will not be accepted. That is, the function of the button will not be changed or activated.

Figure 17A:
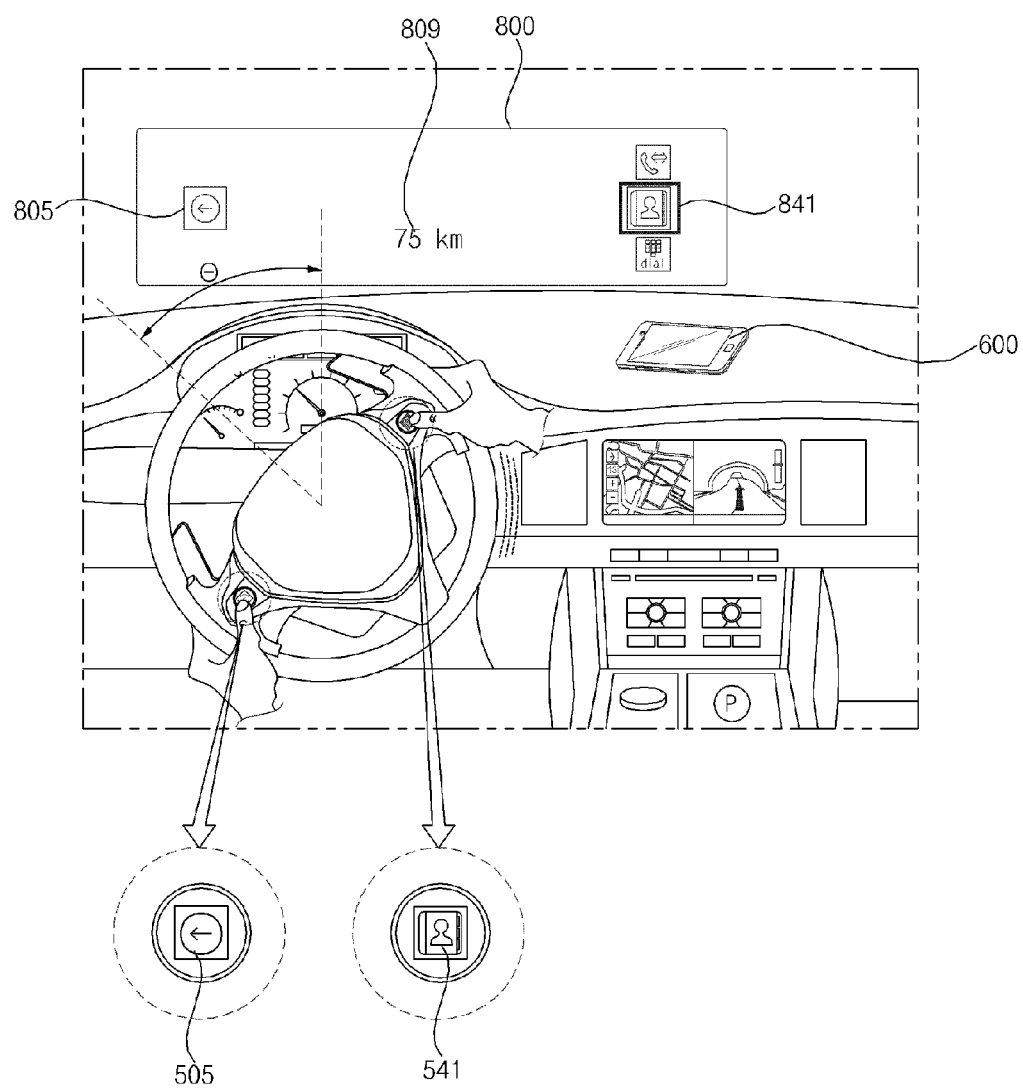
FIGS. 17a and 17b shows temporary lockout of the input device according to the second embodiment of the invention.
Figure 17B:
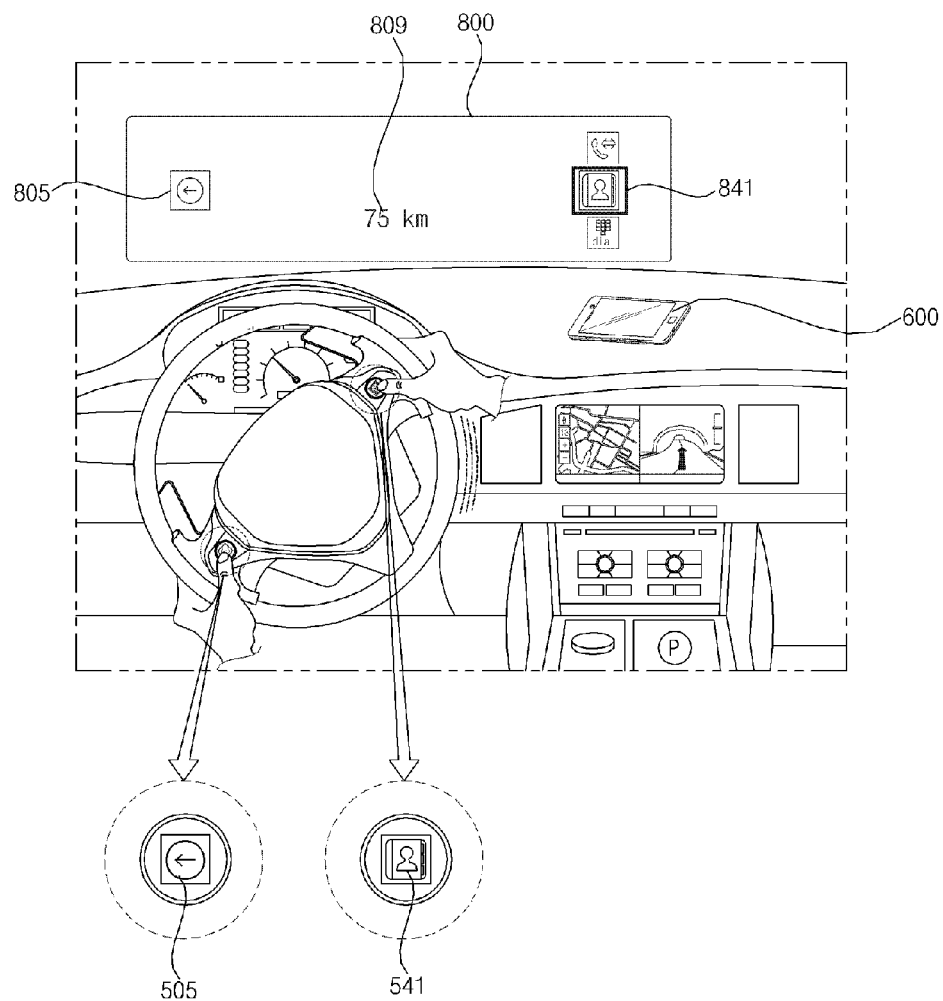

FIGS. 17a and 17b shows temporary lockout of the input device according to the second embodiment of the invention. FIG. 17a shows the case in which a user rotates the handle 150 by a first angle θ when the first button 110L and the second button 110R are respectively set to a menu function and a contact function. If the first angle θ is equal to or greater than a predetermined angle, since a button may be mistakenly touched by rotation of the handle or since button manipulation upon handle rotation increases a risk occurring upon driving the vehicle, the processor 170 can not change the function if the handle rotates by the predetermined angle or more. The predetermined angle can be set to about 60 degrees but can be changed. That is, as shown in FIG. 17b, the menu function and the contact function can be respectively set on the first button 110L and the second button 110R without change.

Figure 18A:
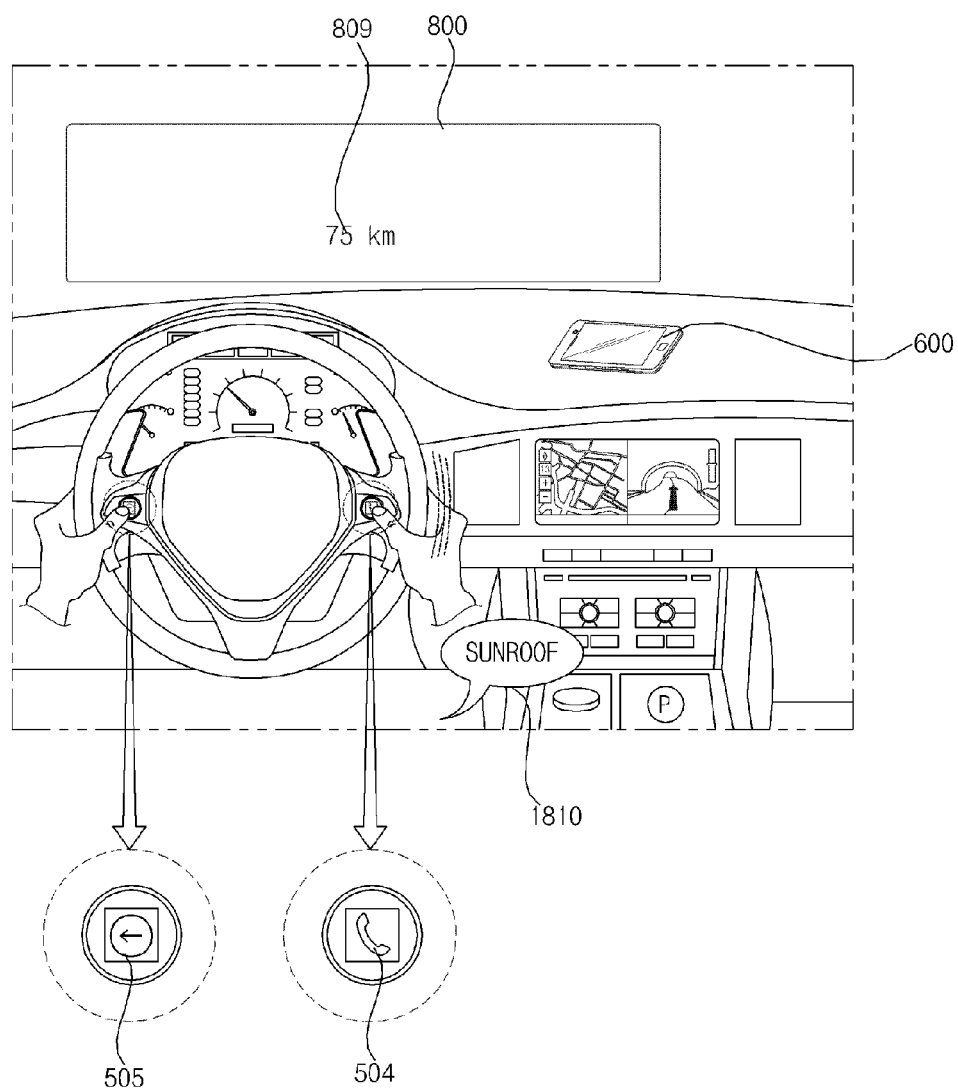
FIGS. 18a and 18b shows sunroof control according to the second embodiment of the invention.
Figure 18B:
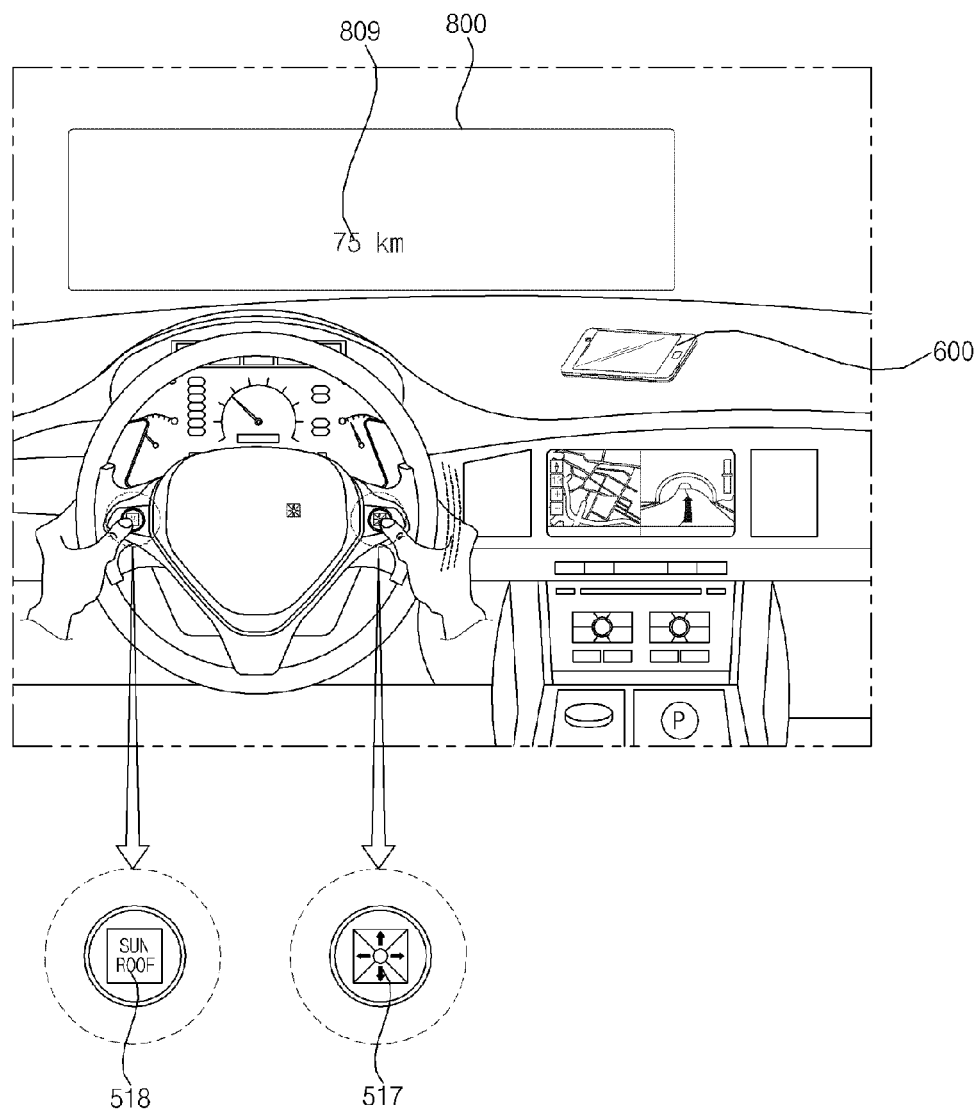

FIGS. 18a and 18b shows sunroof control according to the second embodiment of the invention. More particularly, FIGS. 18a and 18b shows sunroof control based on user voice and button manipulation, unlike FIG. 6. As shown in FIG. 18a, a menu function and a telephone function are respectively set initially on the first button 110L and the second button 110R. At this time, current speed information 809 can be displayed in the output area 800. At this time, if the user outputs voice for sunroof control, that is, voice 1810 "sunroof", the audio input unit 183 can receive the voice 1810. The input device 200b can transmit the voice to the mobile terminal 600 such that the mobile terminal 600 performs a voice recognition operation. The processor 170 can recognize the voice "sunroof" by the voice recognition function of the mobile terminal 600 or a voice recognition algorithm and then change the function of at least one of the first button 110L and the second button 110R to the sunroof control function.

Then, as shown in FIG. 18b, the first button 110L is set to a sunroof control function and the second button 110R is set to a four-direction key function for front/back open/close of the sunroof. Accordingly, the user can conveniently perform sunroof open/close control while driving the vehicle in a state of gripping the handle. In addition, in addition to user button manipulation or user manipulation by voice output, the functions of the first button 110L and the second button 110R can be changed according to a vehicle driving state.

The processor 170 can change the function of at least one of the plurality of buttons based on external environment information. The external environment information may include at least one of call reception information, GPS information, weather information, time information and location information. For example, the processor 170 can set a call reception function on at least one of the plurality of buttons upon receiving a call, set a tunnel mode function on at least one of the plurality of buttons according to reception of GPS information or activate a front and back lamp control function based on weather information, time information and location information.

The processor 170 can change the function of at least one of the plurality of buttons based on vehicle state information. The vehicle state information may include at least one of battery information, fuel information, vehicle speed information, tire information, steering information, vehicle lamp information, vehicle interior temperature information, vehicle exterior temperature information, or vehicle interior humidity information. For example, the processor 170 can activate a battery minimum consumption mode function upon receiving battery information, activate a navigation function for searching for a gas station based on fuel information, activate a navigation function for searching for vehicle information based on tire information, activate a vehicle interior temperature control or a vehicle interior air-conditioning function based on vehicle interior temperature information, vehicle exterior temperature information and vehicle interior humidity information, on at least one of the plurality of buttons. If a user manipulation for changing the function is received when the function of the first button of the plurality of buttons is a first function, the processor 170 of the input device 200b can change the first function of the first button to a second function based on external environment information or vehicle state information, which will now be described with reference to FIGS. 19a to 19c.

Figure 19A:
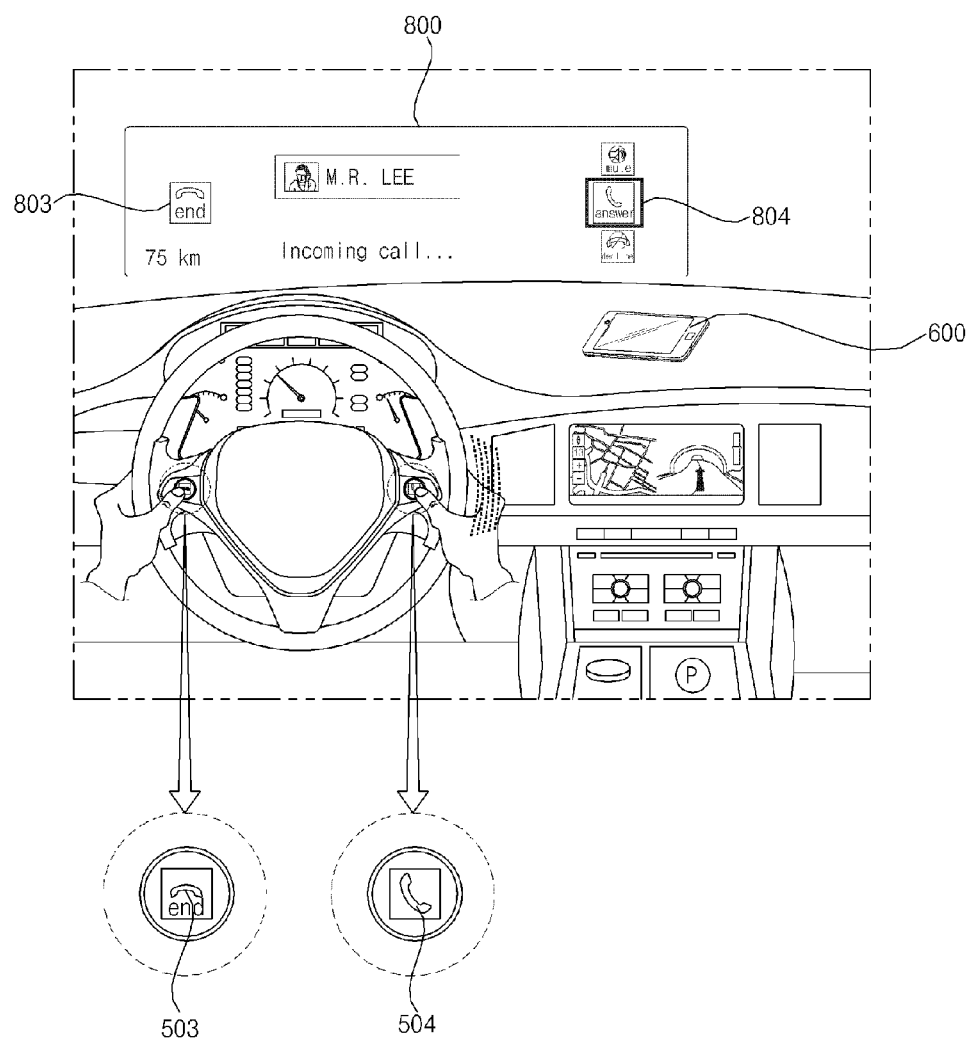
FIGS. 19a to 19c shows receiving telephone call according to the second embodiment of the invention.
Figure 19B:
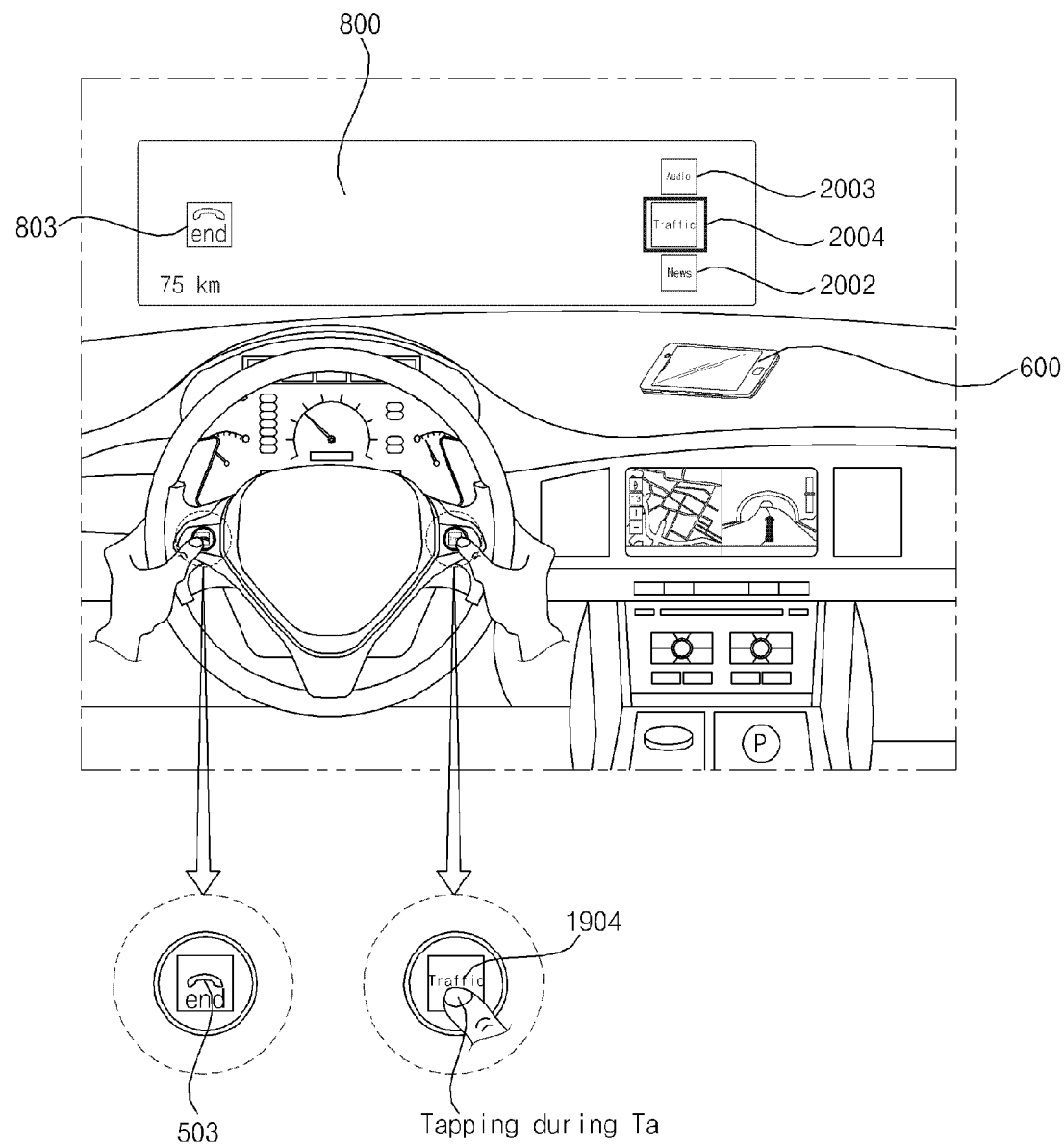
Figure 19C:
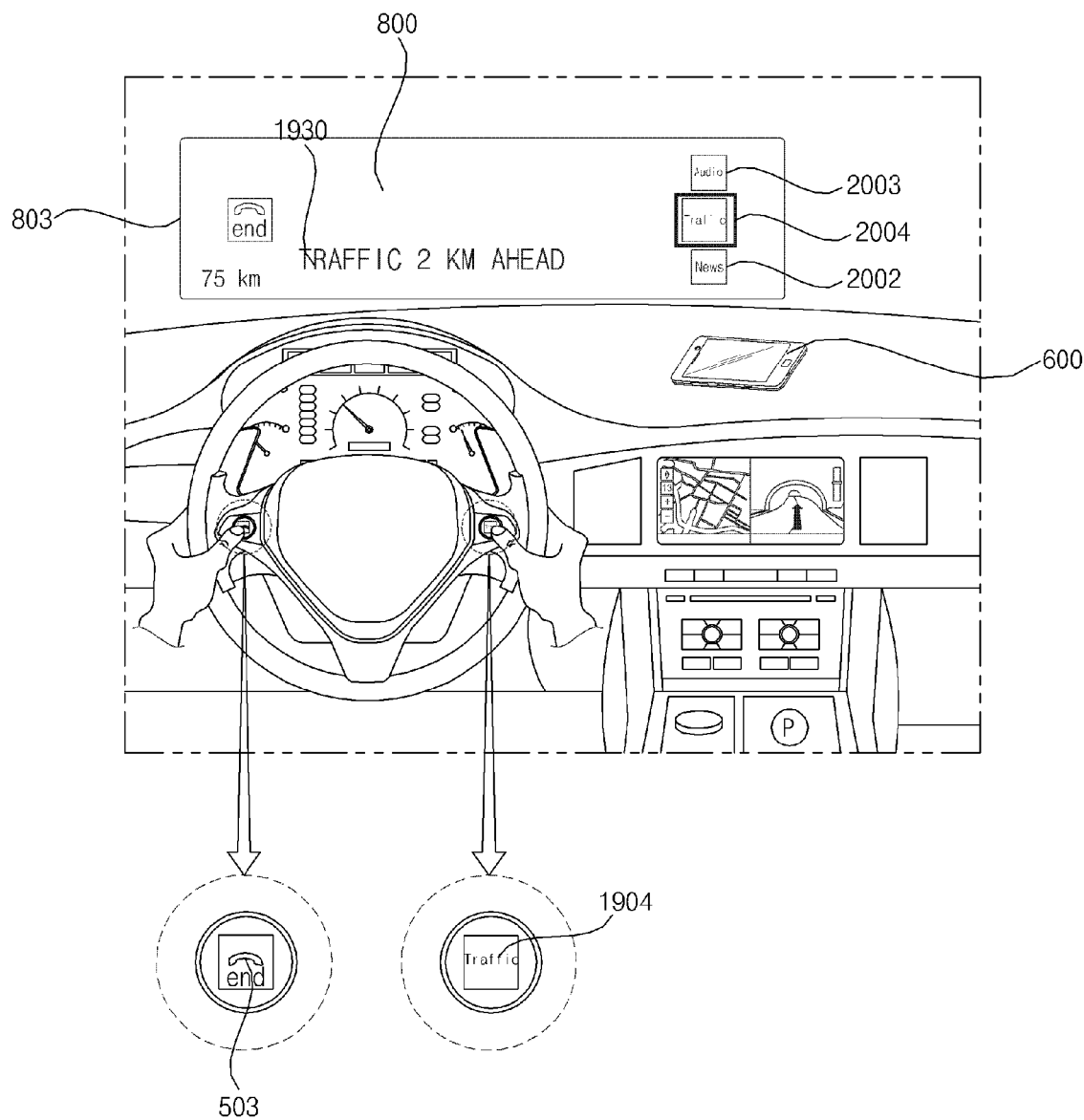

FIGS. 19a to 19c shows receiving telephone call according to the second embodiment of the invention. More particularly, FIG. 19a shows reception of a call via the mobile terminal 600 when the mobile terminal 600 of the user is disposed in the vehicle. Images 503 and 504 can be respectively displayed on the first button 110L and the second button 110R and a ring-off function image 803, a call reception function image 804 and the name and telephone number information of a person who makes a call can be displayed in the HUD 800. As shown in FIG. 19a, if the user taps the second button 110R when a call reception function is set on the second button 110R, call reception can be performed. In addition, telephone conversation content can be output via the audio output unit 185. Further, if the user taps on the second button 110R for a predetermined length of time Ta when the call reception function is set on the second button 110R, that is, if a long tap is performed, the call reception function of the second button 110R can be changed to a traffic information function, as shown in FIG. 19b.

FIG. 19b shows the case in which the traffic information function is set on the second button 110R by a long duration tap input, an image 1904 corresponding thereto is displayed, and an image 2004 indicating the traffic information function is displayed in the HUD 800. Further, an image 2003 indicating an audio function or image 2003 indicating a news function can be further selectively displayed in the HUD 800 by flicking input of the second button 110R. Among the images 2002, 2003 and 2004, an image 2004 indicating traffic information function of the second button 110R can be highlighted. As shown in FIG. 19b, if the user taps the second buttons 110R when the traffic information function is set on the second button 110R, that is, if a short tap is performed, traffic information can be received. The received traffic information can be output via the audio output unit 185 or the display 180.

FIG. 19c shows the case in which real-time traffic information 1930 received via the communication unit 120 is displayed in the output area 800 via the display 180. Accordingly, user convenience is increased. The processor 170 can control change of the function of at least one of the plurality of buttons based on external environment information or vehicle state information in addition to a manipulation signal of the input unit. If a manipulation signal, external environment information and vehicle state information are received within a predetermined period of time, priority is assigned to the manipulation signal.

Similar to FIGS. 19a to 19c, if user input for changing a function is received, that is, long tap is performed, when an incoming call has been received and the function of a specific button has been changed to a telephone function, the function can be changed again in correspondence with user input for changing the function. Alternatively, if user input for changing a function is performed within a predetermined time period when external environment information has been received at a first time, the function can not be changed to the function corresponding to the external environment information but can be changed to the function corresponding to the user input for changing the function. Accordingly, the function can be preferentially changed according to user intention, rather than according to external environment information or vehicle state information.

In the input device according to the second embodiment described with reference to FIGS. 11a to 19c, a touchscreen type button has been focused upon. Instead of the touchscreen type button, function changes described referencing FIGS. 11a to 19c are applicable to a button including a four-direction mechanical button. The input device disposed in the handle according to one embodiment is a dynamic human machine interface (HMI), a function of which can be changed according to a user manipulation or a vehicle driving state. When the function is changed, an image corresponding to the function is displayed on a separate display. Accordingly, a user can change the function to a desired function and confirm the function via the display while gripping the handle of the vehicle. Accordingly, user convenience is improved. More specifically, since the user can find and perform a desired function by changing various functions by movement of a finger and, more particularly, a thumb, while the user's hands are on the handle of the vehicle and the user is looking at the road during driving, a user's stability while driving is improved compared to conventional various fixed button with single function methods. In addition, since data communication with a mobile terminal is performed via a communication unit, the function of a button can be set on a per user basis. Accordingly, a user-friendly dynamic button method can be implemented to change and activate functions on buttons in steering handle while driving.

The input device and the vehicle including the same according to the foregoing embodiments are not restricted to the embodiments set forth herein. Therefore, variations and combinations of the exemplary embodiments set forth herein fall within the scope of the present invention. The input device or the method for operating the same to the foregoing embodiments may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disk, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Functional programs, code, and code segments needed to realize the embodiments herein can be construed by one of ordinary skill in the art.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An input device comprising:
an input unit having a plurality of buttons disposed in a steering wheel of a vehicle;
an interface unit configured to receive data concerning the vehicle or to exchange data to an external device or both;
a communication unit configured to exchange data with a mobile terminal;
a processor to change a function of at least one of the plurality of buttons to a set function based on a manipulation signal from the input unit; and
a display to display an image corresponding to the set function of the at least one of the plurality of buttons,
wherein the processor is configured to set a first button of the plurality of buttons to perform a home function, and to set a menu function or a vehicle interior function to be under the home function,
wherein the processor is configured to change a function of one of the plurality of buttons based on whether the communication unit is connected to the mobile terminal,
wherein the processor is configured to deactivate the first button and set the first button to enter a standby mode based on the manipulation signal from the plurality of buttons not being received within a predetermined time period.

2. The input device according to claim 1, wherein the display includes a projection module to project the image on a windshield of the vehicle.

3. The input device according to claim 1, further comprising:
a touchscreen on the at least one of the plurality of buttons, wherein the processor is configured to change the function of the at least one of the plurality of buttons based on at least one of tap input, drag input or flicking input to the touchscreen, and wherein the touchscreen is configured to display the image corresponding to the set function.

4. The input device according to claim 1, wherein the at least one of the plurality of buttons is one of a touchscreen and a four-direction mechanical button.

5. The input device according to claim 1, wherein the processor is configured to change the function of the at least one of the plurality of buttons based on one of press input strength, number of presses and duration of press.

6. The input device according to claim 1, wherein the processor is configured to set one of a home function, a menu function and a vehicle inner setting function on to a button based on the manipulation signal of the input unit from the at least one of the plurality of buttons.

7. The input device according to claim 1, wherein the processor is configured to generate a vehicle inner setting signal based on the manipulation signal for a second button among the plurality of buttons when the at least one of the plurality of buttons is set to a vehicle inner setting function, and wherein the interface unit is configured to output the vehicle inner setting signal to an external device of the vehicle.

8. The input device according to claim 7, wherein the vehicle inner setting function includes one of vehicle interior window control, vehicle interior audio output control, vehicle interior air-conditioning control, vehicle interior lamp control, vehicle exterior lamp control and sunroof control.

9. The input device according to claim 1, wherein the processor is configured to control setting of any one of the plurality of buttons to one of a telephone function, a messenger function, a memo function, a schedule function, a social networking service (SNS) function, a web connection function and a content playback function upon connection to the mobile terminal.

10. The input device according to claim 1, wherein the processor is configured to change a function of one of the plurality of buttons based on external environment information, and wherein the external environment information includes at least one of call reception information, global positioning system (GPS) information, weather information, time information and location information.

11. The input device according to claim 1, wherein the interface unit is configured to exchange data with a navigation device disposed in the vehicle, and wherein the processor is configured to change a function of one of the plurality of buttons based on global positioning system (GPS) information from the navigation device.

12. The input device according to claim 1, wherein the processor is configured to change a function of one of the plurality of buttons based on vehicle state information, and wherein the vehicle state information includes at least one of battery information, fuel information, vehicle speed information, tire information, steering information, vehicle lamp information, vehicle interior temperature information, vehicle exterior temperature information and vehicle interior humidity information.

13. The input device according to claim 1, wherein when the steering wheel of the vehicle is in a state of being rotated by a predetermined angle or more, the processor will not respond to a manipulation signal from the plurality of buttons.

14. The input device according to claim 13, wherein the processor is configured to change the function of one of the plurality of buttons by activating a battery minimum consumption mode function according to the battery information received through the interface unit.

15. The input device according to claim 1, wherein when a user manipulation for changing a function is received in a state in which a function of a first button among the plurality of buttons is set to a first function, the processor is configured to change the function of the first button to a second function based on one of external environment information and vehicle state information.

16. The input device according to claim 1, wherein the processor is configured to change a function of at least one of the plurality of buttons based on one of external environment information and vehicle state information in addition to a manipulation information from the input unit and is configured to assign priority to the manipulation signal when the manipulation signal, the external environment information and the vehicle state information are all received within a predetermined time period.

17. The input device according to claim 1,
wherein the processor is configured to perform pairing with the mobile terminal via the communication unit, and to assign a function to one of the plurality of buttons that corresponds to at least one of the user or a device of the mobile terminal, based on one of user information or device information of the mobile terminal received through the pairing, and
wherein the processor is configured to receive, from the mobile terminal via the communication unit, data concerning an assigned function that has been edited in advance by the user.

18. A vehicle comprising:
wheels configured to be rotated by a power source;
a steering wheel;
a plurality of buttons disposed in the steering wheel of the vehicle;
an interface unit configured to receive data concerning the vehicle or to exchange data to an external device or both;
a communication unit configured to exchange data with a mobile terminal;
a processor connected to the plurality of buttons and to change a function of at least one of the plurality of buttons to a set function based on a manipulation signal; and
a display to display an image corresponding to the set function of the at least one of the plurality of buttons,
wherein the processor is configured to set a first button of the plurality of buttons to perform a home function, and to set a menu function or a vehicle interior function to be under the home function,
wherein the processor is configured to change a function of one of the plurality of buttons based on whether the communication unit is connected to the mobile terminal,
wherein the processor is configured to deactivate the first button and set the first button to enter a standby mode based on the manipulation signal from the plurality of buttons not being received within a predetermined time period.

19. The vehicle according to claim 18, wherein the processor is configured to control setting of any one of the plurality of buttons to a telephone function, a messenger function, a memo function, a schedule function, a social networking service (SNS) function, a web connection function and a content playback function.

20. The vehicle according to claim 18, wherein when a user manipulation for changing a function is received in a state in which a function of a first button among the plurality of buttons is set to a first function, the processor changes the first function of the first button to a second function based on one of external environment information and vehicle state information.

* * * * *